United States Patent
Abe

(10) Patent No.: US 9,939,622 B2
(45) Date of Patent: Apr. 10, 2018

(54) MICROSCOPE OPTICAL SYSTEM

(71) Applicant: OLYMPUS CORPORATION, Hachioji-shi, Tokyo (JP)

(72) Inventor: Kenichiro Abe, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 90 days.

(21) Appl. No.: 15/197,211

(22) Filed: Jun. 29, 2016

(65) Prior Publication Data
US 2017/0010454 A1 Jan. 12, 2017

(30) Foreign Application Priority Data
Jul. 6, 2015 (JP) .................................. 2015-135655

(51) Int. Cl.
G02B 21/02 (2006.01)
G02B 9/64 (2006.01)

(52) U.S. Cl.
CPC ............... G02B 21/02 (2013.01); G02B 9/64 (2013.01)

(58) Field of Classification Search
CPC .... G02B 21/02; G02B 21/33; G02B 27/0068; G02B 13/24; G02B 13/143; G02B 23/243; G02B 9/62; G02B 1/02; G02B 13/14; G02B 13/22; G02B 15/173; G02B 21/025; G02B 21/22; G02B 26/001; G02B 13/00; G02B 13/0045; G02B 13/06
USPC ........ 359/656–661, 754–757, 763, 764, 766, 359/771, 772, 779, 784
See application file for complete search history.

(56) References Cited

U.S. PATENT DOCUMENTS

| 6,501,603 B2 * | 12/2002 | Kasahara | ............... G02B 21/02 359/656 |
| 7,982,961 B2 | 7/2011 | Fujimoto | |
| 2008/0180805 A1 * | 7/2008 | Yonetani | .............. G02B 21/025 359/661 |

FOREIGN PATENT DOCUMENTS

| JP | 2010186162 A | 8/2010 |
| JP | 2011075982 A | 4/2011 |

* cited by examiner

Primary Examiner — James Greece
Assistant Examiner — Sharrief Broome
(74) Attorney, Agent, or Firm — Holtz, Holtz & Volek PC

(57) ABSTRACT

A microscope optical system includes a first lens group having a positive power, a second lens group, and a third lens group including a positive lens. The first lens group includes: a first lens component arranged closest to an object, the first lens component including a first meniscus lens that has a meniscus shape with a concave surface facing the object side; a second lens component having a positive power that has a meniscus lens shape with the concave surface facing the object side; and a cemented lens including a positive lens and a negative lens that is made of a higher-dispersion material than a material of the positive lens. When NA, $\beta_{G3}$, $D_{G3i}$, $D_{G23}$ represent a numerical aperture of the microscope optical system, a lateral magnification of the third lens group, a spacing between the third lens group and an image plane, a spacing between the second lens group and the third lens group, the microscope optical system satisfies the following conditional expressions:

$0.25 < NA \le 1.51$          (1);

$0.2 < \beta_{G3} < 3$          (2);

$0.1 < D_{G3i}/D_{G23} < 2.5$          (3).

20 Claims, 9 Drawing Sheets

F I G. 1A
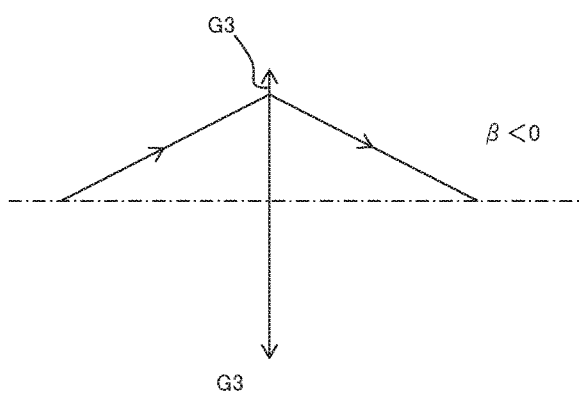
F I G. 1B
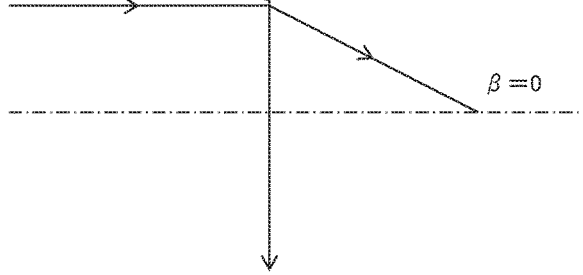
F I G. 1C
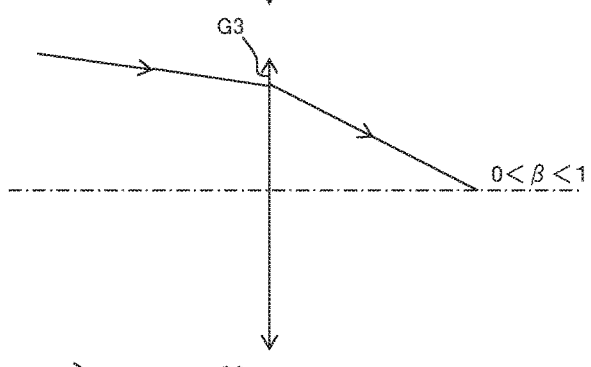
F I G. 1D
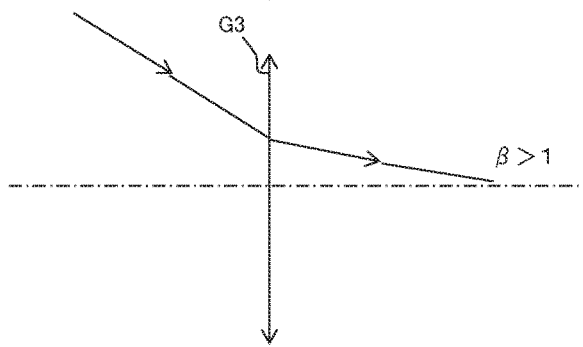

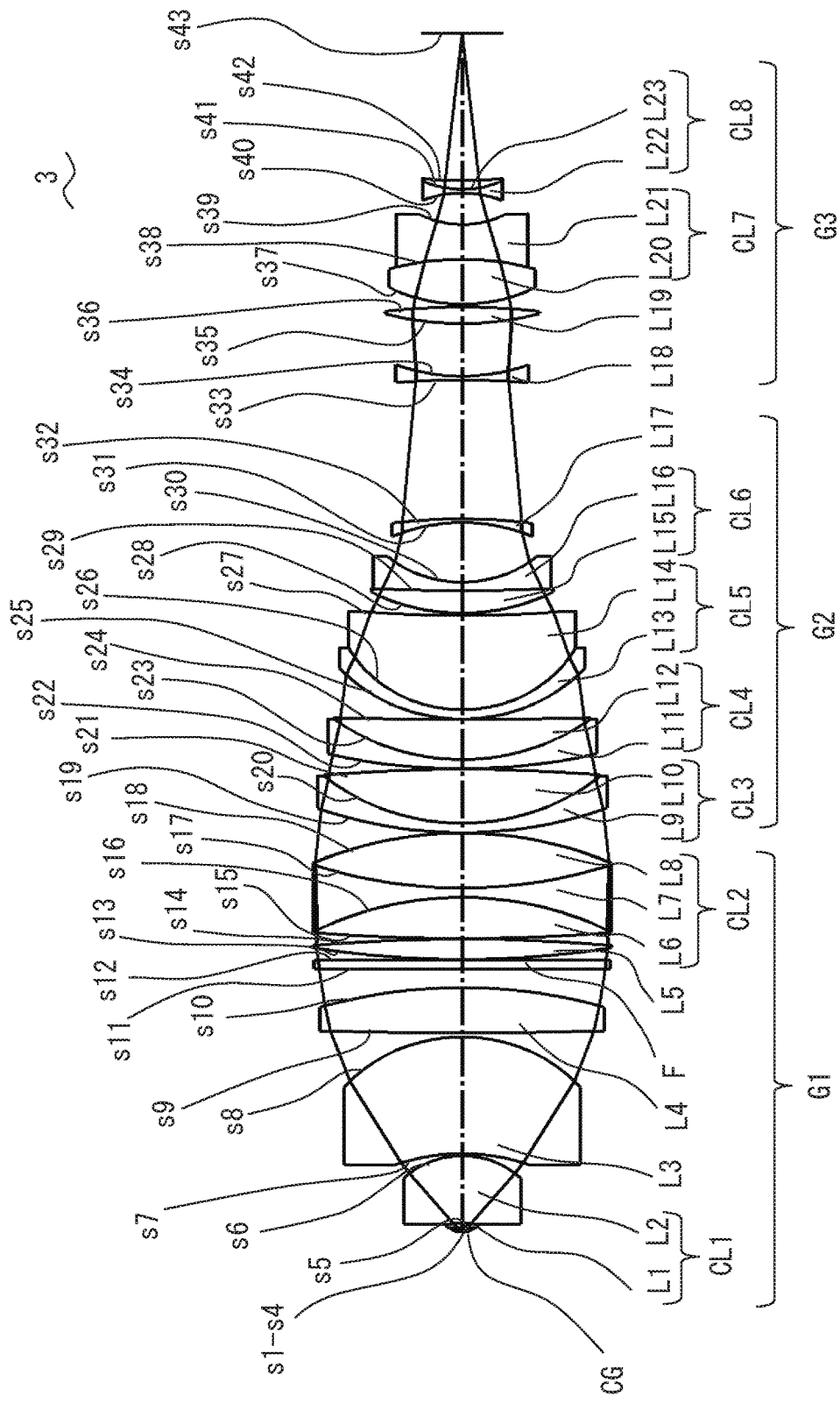
F I G. 6

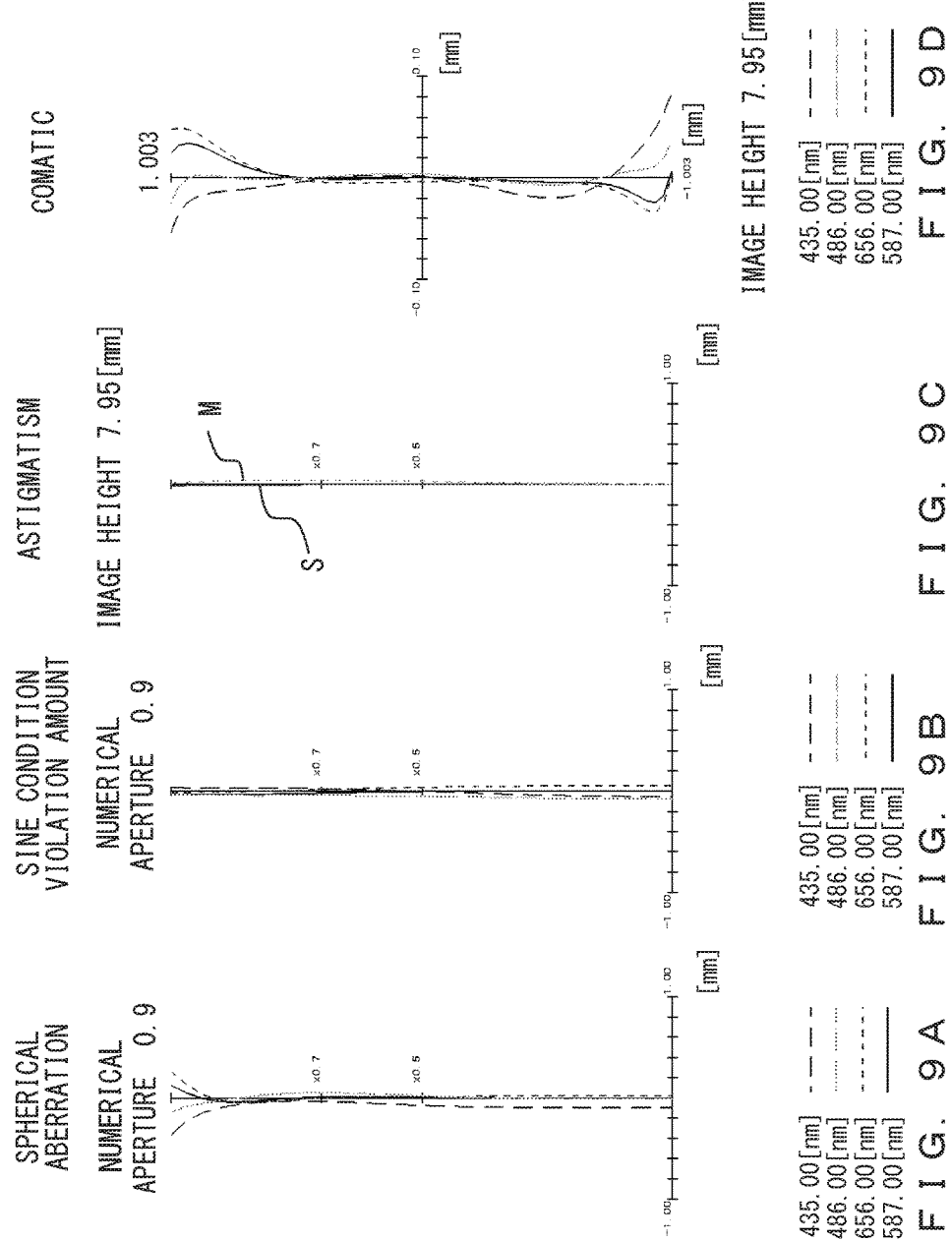

MICROSCOPE OPTICAL SYSTEM

CROSS REFERENCE TO RELATED APPLICATIONS

This application is based upon and claims the benefit of priority from prior Japanese Patent Application No. 2015-135655, filed Jul. 6, 2015, the entire contents of which are incorporated herein by this reference.

BACKGROUND OF THE INVENTION

Field of the Invention

The present invention relates to a microscope optical system.

Description of the Related Art

In recent years, the number of pixels of an image sensor has increased remarkably, and in the field of microscopes, expectations for microscope apparatuses that enable observation and image acquisition while achieving both a wide field of view and a high resolving power have been growing. As an example, when a microscope apparatus having both a wide field of view and a high resolving power is applied to a virtual slide, a scanning speed can increase.

In order to realize the microscope apparatus described above, an objective needs to have a low magnification and a high numerical aperture. Such an objective is described, for example, in Japanese Laid-Open Patent Publication No. 2010-186162 and Japanese Laid-Open Patent Publication No. 2011-075982.

SUMMARY OF THE INVENTION

In an aspect of the present invention, a microscope optical system is provided that includes, in order from an object side, a first lens group having a positive refractive power, a second lens group, and a third lens group including a positive lens. The first lens group includes: a first lens component that is arranged closest to an object, the first lens component including a first meniscus lens that has a meniscus shape with a concave surface facing the object side; a second lens component having a positive refractive power that has a meniscus lens shape with the concave surface facing the object side, the second lens component being arranged close to the first lens component on an image side of the first lens component; and a cemented lens including a positive lens and a negative lens that is made of a higher-dispersion material than a material of the positive lens. The height of an on-axis marginal ray becomes maximum in a lens component closest to an image in the first lens group. A spacing between the second lens group and the third lens group is a maximum lens spacing in an area on the object side of a positive lens arranged closest to the image from among the positive lens included in the third lens group. When NA represents a numerical aperture of the microscope optical system, $\beta_{G3}$ represents a lateral magnification of the third lens group, $D_{G3i}$ represents a spacing between the third lens group and an image plane, and $D_{G23}$ represents a spacing between the second lens group and the third lens group, the microscope optical system satisfies the following conditional expressions:

$$0.25 < NA \leq 1.51 \quad (1);$$

$$0.2 < \beta_{G3} < 3 \quad (2);$$

$$0.1 < D_{G3i}/D_{G23} < 2.5 \quad (3).$$

BRIEF DESCRIPTION OF THE DRAWINGS

The present invention will be more apparent from the following detailed description when the accompanying drawings are referenced.

FIGS. 1A to 1D are diagrams explaining a relationship between the lateral magnification of a third lens group and an incident pencil of light.

FIG. 6 is a cross-sectional view of a microscope optical system 3 in Example 3 of the present invention.

FIGS. 9A to 9D illustrate aberrations of the microscope optical system 4 illustrated in FIG. 8.

DESCRIPTION OF THE EMBODIMENTS

Figure 2:
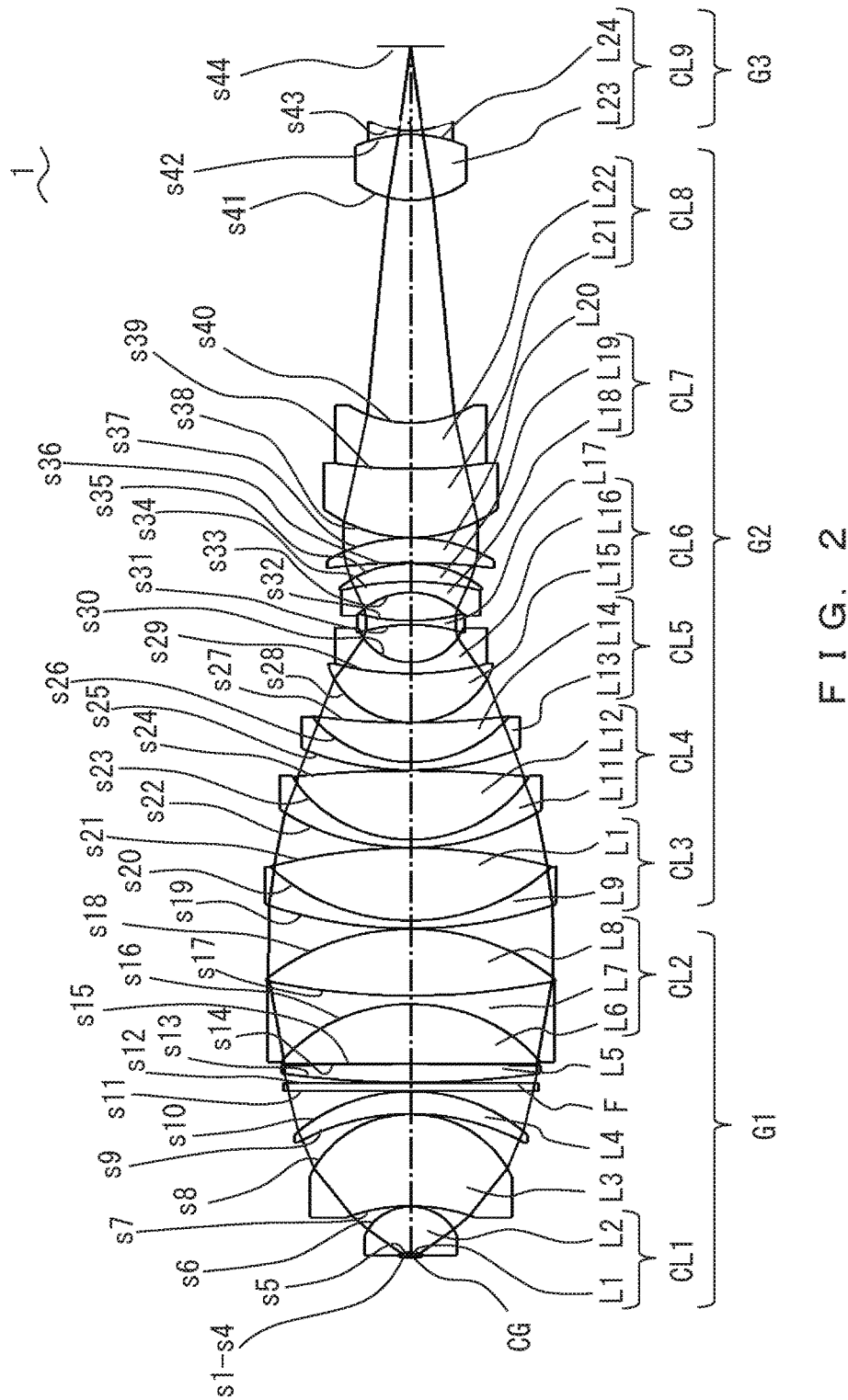
FIG. 2 is a cross-sectional view of a microscope optical system 1 in Example 1 of the present invention.

An off-axis aberration cannot be sufficiently corrected in an infinity-corrected optical system described in Japanese Laid-Open Patent Publication No. 2010-186162 or Japanese Laid-Open Patent Publication No. 2011-075982 in which an infinity-corrected type objective and a tube lens are combined. Accordingly, imaging performance cannot be maintained over the entirety of a wide field of view, and imaging performance in a peripheral portion of a field of view (hereinafter referred to as peripheral performance) deteriorates.

When both a wider field of view and a higher numerical aperture attempt to be achieved in a microscope optical system that is configured of the infinity-corrected optical system described in Japanese Laid-Open Patent Publication No. 2010-186162 or Japanese Laid-Open Patent Publication No. 2011-075982, or when an attempt is made to reduce vignetting such that an off-axis numerical aperture increases, deterioration in the peripheral performance due to an off-axis aberration becomes more remarkable. As a result, it will be more difficult to achieve both a wide field of view and a high resolving power.

A microscope optical system according to an embodiment of the present invention is described. The microscope optical system according to the present embodiment (hereinafter simply referred to as a microscope optical system) is an optical system that receives light from an object plane and forms an image of an object on an image plane. In addition, the microscope optical system according to the present embodiment is a microscope optical system having a wide field of view and a high numerical aperture and a microscope optical system in which an off-axis aberration has been satisfactorily corrected.

The microscope optical system is configured of a first lens group having a positive refractive power, a second lens group having a positive or negative refractive power, and a third lens group having a positive or negative refractive power that includes a positive lens in order from an object side. The first lens group has an effect of converting a divergent pencil of light emitted from an object point into a convergent pencil of light. The second lens group has an effect of satisfactorily correcting principally an on-axis chromatic aberration and a spherical aberration, and gradually reducing the height of a marginal ray. The third lens group has an effect of reducing a principal ray inclination angle of an off-axis pencil of light for which a principal ray height has sufficiently increased and emitting the off-axis pencil of light to an image plane. In this specification, a pencil of light refers to a flux of rays emitted from a point of an object (an object point).

The microscope optical system is characterized in that the height of an on-axis marginal ray is maximum in a lens component closest to an image in the first lens group. This characteristic allows the first lens group to be specified. The microscope optical system is also characterized in that a spacing between the second lens group and the third lens group is a maximum lens spacing in an area on an object side of a positive lens that is arranged closest to the image from among a positive lens included in the third lens group. This characteristic allows the second lens group and the third lens group to be specified. In this specification, a lens component refers to a single lens block in which only two surfaces, surfaces on an object side and an image side, from among lens surfaces that a ray of light passes through are brought into contact with air (or immersion liquid), regardless of whether it is a single lens or a cemented lens.

The first lens group includes a first lens component that is arranged closest to an object, a second lens component that is arranged close to the first lens component on an image side of the first lens component, and a first cemented lens that is a cemented lens including a positive lens and a negative lens that is made of a higher-dispersion material than the material of the positive lens.

The first lens component includes a first meniscus lens that has a meniscus shape with a concave surface facing the object side. More specifically, the first lens component is a first meniscus lens, or a cemented lens that is configured of the first meniscus lens and a positive lens arranged on the object side of the first meniscus lens. As a result of the first lens component including the first meniscus lens, a concave surface is arranged in an area in which the height of a marginal ray is low. Accordingly, principally field curvature can be satisfactorily corrected in a state in which a pencil of light from an object is converged (namely, in a state in which a pencil of light is suppressed from spreading). In this specification, convergence of a pencil of light is not limited to conversion of a pencil of light into a convergent pencil of light, and it refers to an effect of making a pencil of light be closer to a convergent pencil of light, and includes suppressing a divergent pencil of light from spreading.

A configuration in which the first meniscus lens is arranged closest to the object allows, in particular, the height of a marginal ray on the concave surface to decrease. However, when the first meniscus lens is arranged closest to the object, a recessed space is formed on the object side of the microscope optical system. When the microscope optical system is an immersion optical system, observation is performed in a state in which a space between the microscope optical system and an object is filled with immersion liquid. However, it is sometimes difficult to fill the recessed space above with immersion liquid. In this case, a positive lens that is made of a material having a refractive index close to the refractive index of the immersion liquid may be arranged on the object side of the first meniscus lens, and a cemented lens that is configured of the positive lens and the first meniscus lens may be used as a first lens component.

The second lens component has a positive refractive power, and has a meniscus shape with a concave surface facing the object side. Accordingly, a pencil of light emitted from the first lens component can be gradually converged in a state in which generation of a spherical aberration and a comatic aberration is reduced.

The first cemented lens has a chromatic aberration correction effect (also referred to as an achromatism effect), and the first cemented lens is arranged on the image side of the second lens component. In the microscope optical system, the height of an on-axis marginal ray becomes maximum in the first lens group. Accordingly, an on-axis chromatic aberration can be effectively corrected by arranging a cemented lens having a chromatic aberration correction effect in the first lens group in which the height of the on-axis marginal ray is great.

A microscope optical system is configured so as to satisfy conditional expressions (1) to (3) below.

$$0.25 < NA \leq 1.51 \tag{1}$$

$$0.2 < \beta_{G3} < 3 \tag{2}$$

$$0.1 < D_{G3i}/D_{G23} < 2.5 \tag{3}$$

In these expressions, NA represents a numerical aperture on the object side of the microscope optical system. $\beta_{G3}$ represents a lateral magnification of the third lens group. $D_{G3i}$ represents a spacing between the third lens group and an image plane. Namely, $D_{G3i}$ represents the length on an optical axis between a lens surface closest to an image in the third lens group and the image plane. $D_{G23}$ represent a spacing between the second lens group and the third lens group. Namely, $D_{G23}$ represent the length on the optical axis between a lens surface closest to the image in the second lens group and a lens surface closest to an object in the third lens group.

Conditional expression (1) is a conditional expression to obtain a sufficient resolving power. When NA is smaller than a lower limit value of conditional expression (1), a sufficient resolving power cannot be obtained due to a diffraction limit. When NA is greater than an upper limit value of conditional expression (1), a spread angle of a marginal ray incident on the microscope optical system increases excessively. Accordingly, aberration cannot be corrected sufficiently in the microscope optical system.

Conditional expression (2) is a conditional expression to satisfactorily correct principally a comatic aberration. Considering that light emitted from the third lens group is condensed on the image plane, the lateral magnification $\beta_{G3}$ of the third lens group and a pencil of light incident on the third lens group have a relationship illustrated in FIGS. 1A to 1D. Stated another way, as illustrated in FIG. 1A, when the third lens group condenses a divergent pencil of light on the image plane, $\beta_{G3}<0$ is established. As illustrated in FIG. 1B, when the third lens group condenses a parallel pencil of light on the image plane, $\beta_{G3}=0$ is established. As illustrated in FIGS. 1C and 1D, when the third lens group condenses a convergent pencil of light on the image plane, $\beta_{G3}>0$ is established. In particular, when the third lens group further converges the convergent pencil of light, and condenses the convergent pencil of light on the image plane, $0<\beta_{G3}<1$ is established. When the third lens group converts the convergent pencil of light so as to be in a less convergent state, and condenses the convergent pencil of light on the image plane, $\beta_{G3}>1$ is established. Conditional expression (2) expresses that the lateral magnification $\beta_{G3}$ of the third lens group has a positive value, and therefore a pencil of light incident on the third lens group is a convergent pencil of light.

When the $\beta_3$ is smaller than a lower limit value of conditional expression (2), the convergent pencil of light incident on the third lens group is not in a sufficiently convergent state. Accordingly, the height of an off-axis marginal ray increases excessively in the third lens group in which the height of an off-axis principal ray is great, and it is difficult to suppress a comatic aberration from being generated in the third lens group. When $\beta_3$ is greater than an upper limit value of conditional expression (2), the magnification of the third lens group is excessively large, and therefore various aberrations such as a comatic aberration generated in the first lens group and the second lens group are greatly amplified in the third lens group. Accordingly, regardless of whether $\beta_3$ is greater than the upper limit value of conditional expression (2) or smaller than the lower limit value of conditional expression (2), it is difficult to correct a comatic aberration in the entirety of the microscope optical system.

Conditional expression (3) is a conditional expression to satisfactorily correct principally a chromatic aberration of magnification and a distortion aberration. In order to satisfactorily correct the chromatic aberration of magnification and the distortion aberration of the microscope optical system, it is effective to arrange the third lens group in an area near the image plane in which the height of the off-axis principal ray is great and to increase the height of the off-axis principal ray in a positive lens included in the third lens group. When $D_{G3i}/D_{G23}$ is greater than an upper limit value of conditional expression (3), a spacing between the third lens group and the image plane increases excessively. Accordingly, it is difficult to effectively correct the chromatic aberration of magnification and the distortion aberration. When $D_{G3i}/D_{G23}$ is smaller than a lower limit value of conditional expression (3), the spacing between the third lens group and the image plane decreases excessively. In this case, it is difficult to arrange an optical component such as an infrared ray cut filter (a so-called IR cut filter) between the microscope optical system and the image plane. Further, because the optical system is adjacent to the image plane, reflection of a foreign substance becomes conspicuous.

In a microscope optical system configured as described above, an off-axis aberration can be satisfactorily corrected in a state in which both a wide field of view and a high numerical aperture are achieved. In contrast, in a microscope optical system in a conventional technology, namely, an infinity-corrected optical system in which an infinity-corrected objective and a tube lens are combined, when a low-magnification objective having a high numerical aperture is used in order to achieve both a wide field of view and a high numerical aperture, an exit pupil diameter inevitably increases. Accordingly, the height of an off-axis marginal ray incident on the tube lens increases excessively, and it is difficult to sufficiently correct a comatic aberration. It is also difficult to satisfactorily correct an aberration individually in the objective and the tube lens. In order to satisfactorily correct an aberration only in the objective, as an example, the height of an on-axis marginal ray needs to sufficiently decrease such that field curvature is corrected, and the height of an off-axis principal ray needs to sufficiently increase such that a chromatic aberration of magnification is corrected in an optical system of the objective. However, it is difficult to adjust the height of a ray in the optical system of the objective, as described above. The microscope optical system according to the present embodiment is not designed to be an infinity-corrected optical system, but has the configuration described above. Consequently, the microscope optical system according to the present embodiment enables an off-axis aberration to be satisfactorily corrected in a state in which both a wide field of view and a high numerical aperture are achieved.

The microscope optical system may be configured so as to satisfy conditional expression (2-1) or (2-2) below instead of conditional expression (2). The microscope optical system may be configured so as to satisfy conditional expression (3-1) or (3-2) below instead of conditional expression (3).

$$0.35<\beta_{G3}<4 \tag{2-1}$$

$$0.6<\beta_{G3}<2 \tag{2-2}$$

$$0.2<D_{G3i}/D_{G23}<1.8 \tag{3-1}$$

$$0.3<D_{G3i}/D_{G23}<1.5 \tag{3-2}$$

A further desirable configuration of the microscope optical system is described below.

It is desirable that the microscope optical system be an immersion optical system. When the microscope optical system is designed so as to be an immersion optical system, a numerical aperture that is greater than 1 can be achieved, and a high-definition image can be obtained. Even when a numerical aperture is not greater than 1, a high numerical aperture can be obtained at a small spread angle of a marginal ray, compared with a case in which the microscope optical system is a dry optical system.

The first cemented lens included in the first lens group may be a three-lens cemented lens. In this case, it is desirable that the three-lens cemented lens be configured of two positive lenses and a negative lens that is made of a higher-dispersion material than the material of the two positive lenses. By configuring the first cemented lens so as to be a three-lens cemented lens, an on-axis chromatic aberration can be corrected more effectively.

The second lens group includes two or more positive lens components. It is desirable that at least one of a positive lens component closest to an object and a positive lens component second closest to the object that are included in the second lens group be a cemented lens having a chromatic aberration correction effect. Stated another way, it is desirable that at least one of the positive lens component closest to the object and the positive lens component second closest to the object be a cemented lens that includes a positive lens and a negative lens that is made of a higher-dispersion material than the material of the positive lens. The second lens group has an effect of gradually reducing the height of an on-axis marginal ray. Some of the lens components configuring the second lens group are configured to be cemented lenses having an achromatism effect such that principally an on-axis chromatic aberration can be effectively corrected. In particular, by arranging the cemented lens in an area on the object side in which the height of the marginal ray is great, the on-axis chromatic aberration can be corrected effectively.

It is desirable that the second lens group include a lens component having a meniscus shape with a concave surface facing an image side. By including the lens component above, a concave surface can be arranged in an area in which the height of an on-axis marginal ray is small. This allows field curvature to be corrected effectively. In the second lens group, the height of the on-axis marginal ray is relatively small, and the height of the off-axis principal ray is small. Accordingly, by arranging a lens component having the meniscus shape described above in the second lens group, field curvature can be corrected in a state in which the generation of astigmatism and a comatic aberration is reduced.

It is desirable that the third lens group include a negative lens in addition to a positive lens. By arranging the negative lens in the third lens group in which the height of the marginal ray sufficiently decreases, the Petzval sum can be effectively corrected, and field curvature can be corrected. The positive lens and the negative lens may be cemented. The third lens group may include only a lens component that is a cemented lens that is configured of a positive lens and a negative lens. Further, the third lens group may include one or more positive lenses. It is desirable that at least one of the one or more positive lenses be made of a high-dispersion material for which the Abbe number is smaller than or equal to 55 in order to effectively correct a chromatic aberration of magnification.

It is desirable that a microscope optical system be configured to satisfy conditional expressions (4) to (13) below.

$$0.2 \leq D_{G23}/h_{max} \leq 2 \quad (4)$$

$$0.1 \leq \Phi_{G2i}/\Phi_{G1i} \leq 0.9 \quad (5)$$

$$0.1 \leq h_{2Gi}/h_{max} \leq 0.9 \quad (6)$$

$$-0.95 \leq h_{L11}/r_{11} \leq -0.1 \quad (7)$$

$$0 \leq |f_{G1}/f_{G23}| \leq 0.5 \quad (8)$$

$$0.05 \leq f_{G1}/f_{U2} \leq 0.6 \quad (9)$$

$$0 \leq f_{G1}/f_{Ua} \leq 0.4 \quad (10)$$

$$0 \leq f_{G1}/f_{Ub} \leq 0.4 \quad (11)$$

$$-1.5 \leq r_{12}/d_{o12} \leq -0.75 \quad (12)$$

$$-0.8 \leq f_{G1}/f_{L1} \leq 0.8 \quad (13)$$

In these expressions, $h_{max}$ represents a maximum value of the height of an on-axis marginal ray. $\Phi_{G1i}$ represents an effective diameter of a lens surface closest to an image in the first lens group. $\Phi_{G2i}$ represents an effective diameter of a lens surface closest to an image in the second lens group. $h_{2Gi}$ represents the height of an on-axis marginal ray on the lens surface closest to the image in the second lens group. $h_{L11}$ represents the height of the on-axis marginal ray on a lens surface on an object side of the first meniscus lens. $r_{11}$ represents a radius of curvature of the lens surface on the object side of the first meniscus lens. $f_{G1}$ represents a focal length of the first lens group. $f_{G23}$ represents a synthetic focal length of an optical system that is configured of the second lens group and the third lens group. $f_{U2}$ represents a focal length of the second lens component. $f_{Ua}$ represents a focal length of a positive lens component closest to an object from among two or more positive lens components included in the second lens group. $f_{Ub}$ represents a focal length of a positive lens component second closest to the object from among the two or more positive lens components included in the second lens group. $r_{12}$ represents a radius of curvature of a lens surface on an image side of the first meniscus lens. $d_{o12}$ represents the length on an optical axis from an object plane to the lens surface on the image side of the first meniscus lens. $f_{L1}$ represents a focal length of the first meniscus lens. In this specification, an effective diameter of a lens surface is defined by the height (the length from the optical axis) of a ray of light that is made incident on the lens surface in a portion farthest from the axis from among rays of light that is made incident on the lens surface and that relate to imaging.

Conditional expression (4) is a conditional expression to satisfactorily correct principally a spherical aberration and a comatic aberration. In order to satisfactorily correct aberration and form an image while suppressing the entire optical length of the microscope optical system within a prescribed range, it is effective that an off-axis principal ray be made incident on the third lens group at a sufficient height in a state in which spaces for respective lens groups are secured. When $D_{G23}/h_{max}$ is greater than an upper limit value of conditional expression (4), it is difficult to secure spaces that have prescribed areas or more for the respective lens groups. By suppressing $D_{G23}/h_{max}$ so as to be smaller than or equal to the upper limit value, the length on the optical axis of the second lens group can be secured without a space for the third lens group being excessively reduced. Consequently, in the second lens group, the generation of a spherical aberration and a comatic aberration can be reduced or satisfactorily corrected, and the height of the on-axis marginal ray can be gradually reduced. When $D_{G23}/h_{max}$ is smaller than a lower limit value of conditional expression (4), a spacing between the second lens group and the third lens group decreases excessively, and the height of the off-axis principal ray incident on the third lens group also decreases excessively. By making $D_{G23}/h_{max}$ greater than or equal to the lower limit value, the height of the off-axis principal ray incident on the third lens group sufficiently increases, and therefore a distortion aberration and a chromatic aberration of magnification can be satisfactorily corrected. In addition, a sufficient space to arrange an optical component such as a dichroic prism can be secured between the second lens group and the third lens group.

It is further desirable that the microscope optical system satisfy conditional expression (4-1) or (4-2) below instead of conditional expression (4).

$$0.4 \leq D_{G23}/h_{max} \leq 1.8 \quad (4\text{-}1)$$

$$0.6 \leq D_{G23}/h_{max} \leq 1.6 \quad (4\text{-}2)$$

Conditional expression (5) is a conditional expression to satisfactorily correct principally a high-order comatic aberration. The on-axis marginal ray becomes maximum near an emission portion of the first lens group, gradually decreases in the second lens group, and is emitted from the second lens group. When $\Phi_{G2i}/\Phi_{G1i}$ is greater than an upper limit value of conditional expression (5), the height of the off-axis marginal ray near an emission portion of the second lens group increases excessively. By suppressing $\Phi_{G2i}/\Phi_{G1i}$ so as to be smaller than or equal to the upper limit value, the height of the off-axis marginal ray near the emission portion of the second lens group sufficiently decreases. Consequently, when a spherical aberration and a comatic aberration are corrected near the emission portion of the second lens group, the generation of a high-order comatic aberration can be reduced. When $\Phi_{G2i}/\Phi_{G1i}$ is smaller than a lower limit value of conditional expression (5), the second lens group has a large refractive power in order to realize a low off-axis marginal ray height near the emission portion of the second lens group. Accordingly, by making $\Phi_{G2i}/\Phi_{G1i}$ greater than or equal to the lower limit value, the refractive power of the second lens group can be prevented from excessively increasing such that the generation of various aberrations can be reduced.

It is further desirable that the microscope optical system satisfy conditional expression (5-1) or (5-2) below instead of conditional expression (5).

$$0.15 \leq \Phi_{G2i}/\Phi_{G1i} \leq 0.8 \quad (5\text{-}1)$$

$$0.2 \leq \Phi_{G2i}/\Phi_{G1i} \leq 0.7 \quad (5\text{-}2)$$

Conditional expression (6) is a conditional expression to satisfactorily correct principally a high-order comatic aberration. $\Phi_{G2i}$ is twice as great as $h_{2Gi}$. A maximum value of the height of the on-axis marginal ray is almost the same as a maximum value of the height of the off-axis marginal ray near the emission portion of the first lens group. Therefore, $\Phi_{G1i}$ is almost twice as great as $h_{max}$. Accordingly, $\Phi_{G2i}/\Phi_{G1i} \approx h_{2Gi}/h_{max}$ is established, and a technical significance of conditional expression (6) is almost the same as that of conditional expression (5).

Conditional expression (7) is a conditional expression to converge a divergent pencil of light emitted from an object and satisfactorily correct principally field curvature. By suppressing $h_{L11}/r_{11}$ so as to be smaller than or equal to an upper limit value of conditional expression (7), a radius of curvature of a lens surface on an object side of the first meniscus lens sufficiently decreases. Consequently, principally field curvature can be satisfactorily corrected. Further, by making $h_{L11}/r_{11}$ greater than or equal to a lower limit value of conditional expression (7), a divergent pencil of light emitted from an object can be sufficiently converged.

It is further desirable that the microscope optical system satisfy conditional expression (7-1) or (7-2) below instead of conditional expression (7).

$$-0.8 \leq h_{L11}/r_{11} \leq -0.15 \quad (7\text{-}1)$$

$$-0.7 \leq h_{L11}/r_{11} \leq -0.25 \quad (7\text{-}2)$$

Conditional expression (8) is a conditional expression to satisfactorily correct principally a comatic aberration. By suppressing $f_{G1}/|f_{G23}|$ so as to be smaller than or equal to an upper limit value of conditional expression (8), the height of the off-axis marginal ray in the second lens group is prevented from increasing excessively due to an excessive increase in a focal length of the first lens group, and the generation of a comatic aberration in the second lens group can be reduced. Consequently, the comatic aberration in the entirety of an optical system can be satisfactorily corrected.

It is further desirable that the microscope optical system satisfy conditional expression (8-1) or (8-2) below instead of conditional expression (8).

$$0 \leq f_{G1}/|f_{G23}| \leq 0.4 \quad (8\text{-}1)$$

$$0 \leq f_{G1}/|f_{G23}| \leq 0.3 \quad (8\text{-}2)$$

Conditional expression (9) is a conditional expression to satisfactorily correct principally a comatic aberration and a spherical aberration. By suppressing $f_{G1}/f_{U2}$ so as to be smaller than or equal to an upper limit value of conditional expression (9), a focal length of the second lens component is prevented from decreasing excessively, and therefore the second lens component can refract a divergent pencil of light relatively gradually. Accordingly, a divergent pencil of light can be gradually converged while the generation of a spherical aberration and a comatic aberration is reduced. Further, by making $f_{G1}/f_{U2}$ greater than or equal to a lower limit value of conditional expression (9), the focal length of the second lens component is prevented from increasing excessively. Accordingly, a degree of divergence of a pencil of light emitted from the second lens component can be reduced. As a result, the height of a marginal ray can decrease in an area on an image side of the second lens component. Thus, a divergent pencil of light can be gradually converged in the first lens group while the generation of a spherical aberration and a comatic aberration in the first lens group is reduced.

It is further desirable that the microscope optical system satisfy conditional expression (9-1) or (9-2) below instead of conditional expression (9).

$$0.1 \leq f_{G1}/f_{U2} \leq 0.5 \quad (9\text{-}1)$$

$$0.15 \leq f_{G1}/f_{U2} \leq 0.4 \quad (9\text{-}2)$$

Conditional expressions (10) and (11) are conditional expressions to reduce the generation of a spherical aberration and a comatic aberration in the second lens group. In order to gradually reduce the height of a marginal ray while suppressing the generation of the spherical aberration and the comatic aberration in the second lens group, it is desirable that, in particular, a positive lens component that is located in an area close to an object in which the height of the marginal ray is great in the second lens group have a sufficiently longer focal length than the focal length of the first lens group.

By suppressing $f_{G1}/f_{Ua}$ so as to be smaller than or equal to an upper limit value of conditional expression (10), a focal length of a positive lens component closest to an object in the second lens group sufficiently increases, compared with the focal length of the first lens group. Accordingly, the generation of the spherical aberration and the comatic aberration in the second lens group can be reduced. Similarly, by suppressing $f_{G1}/f_{Ub}$ so as to be smaller than or equal to an upper limit value of conditional expression (11), a focal length of a positive lens component second closest to the object in the second lens group sufficiently increases, compared with the focal length of the first lens group. Consequently, the generation of the spherical aberration and the comatic aberration in the second lens group can be reduced.

It is further desirable that the microscope optical system satisfy conditional expression (10-1) or (10-2) below instead of conditional expression (10), and satisfy conditional expression (11-1) or (11-2) instead of conditional expression (11).

$$0 \leq f_{G1}/f_{Ua} \leq 0.3 \quad (10\text{-}1)$$

$$0 \leq f_{G1}/f_{Ua} \leq 0.2 \quad (10\text{-}2)$$

$$0 \leq f_{G1}/f_{Ub} \leq 0.3 \quad (11\text{-}1)$$

$$0 \leq f_{G1}/f_{Ub} \leq 0.2 \quad (11\text{-}2)$$

Conditional expression (12) is a conditional expression to satisfactorily correct principally a spherical aberration and a comatic aberration. By suppressing $r_{12}/d_{o12}$ so as to be smaller than or equal to an upper limit value of conditional expression (12), a radius of curvature of a lens surface (a convex surface) on an image side of the first meniscus lens is prevented from decreasing excessively. Accordingly, an incident angle and a refraction angle of the on-axis and off-axis marginal rays with respect to the convex surface do not increase excessively, and the generation of the spherical aberration and the comatic aberration can be reduced by the first meniscus lens. Further, by making $r_{12}/d_{o12}$ greater than or equal to a lower limit value of conditional expression (12), the radius of curvature of the lens surface (the convex surface) on the image side of the first meniscus lens is prevented from increasing excessively. Accordingly, on-axis and off-axis pencils of light can be sufficiently converged by the first meniscus lens, and the generation of the spherical aberration and the comatic aberration in an optical system on the image side of the first meniscus lens can be reduced.

Conditional expression (13) is a conditional expression to satisfactorily correct principally a spherical aberration and a comatic aberration. By suppressing $f_{G1}/f_{L1}$ so as to be smaller than or equal to an upper limit value of conditional expression (13), a focal length of the first meniscus lens is prevented from decreasing excessively when the first meniscus lens has a positive focal length, and a divergent pencil of light can be refracted relatively gradually by the first meniscus lens component. Consequently, the divergent pencil of light can be gradually converged while the generation of the spherical aberration and the comatic aberration is reduced. Further, by making $f_{G1}/f_{L1}$ greater than or equal to a lower limit value of conditional expression (13), the focal length of the first meniscus lens is prevented from decreasing excessively when the first meniscus lens has a negative focal length. Accordingly, a degree of divergence of a pencil of light emitted from the first meniscus lens can be reduced. As a result, the height of a marginal ray can decrease in an area on an image side of the first meniscus lens. Thus, the divergent pencil of light can be gradually converged by the first lens group while the generation of the spherical aberration and the comatic aberration in the first lens group is reduced.

It is further desirable that the microscope optical system satisfy conditional expression (13-1) or (13-2) below instead of conditional expression (13).

$$-0.7 \leq f_{G1}/f_{L1} \leq 0.7 \quad (13\text{-}1)$$

$$-0.6 \leq f_{G1}/f_{L1} \leq 0.6 \quad (13\text{-}2)$$

Examples of the microscope optical system above are described below in detail.

EXAMPLE 1

FIG. 2 is a cross-sectional view of a microscope optical system 1 in this example. The microscope optical system 1 is an optical system that condenses light emitted from an object point on an image plane, and the microscope optical system 1 is configured of a first lens group G1 having a positive refractive power, a second lens group G2 having a positive refractive power, and a third lens group G3 having a negative refractive power in order from an object side. The microscope optical system 1 is an immersion type microscope optical system.

The first lens group G1 includes a cemented lens CL1 (a first lens component) that includes a lens L2 (a first meniscus lens) having a meniscus shape with a concave surface facing the object side, and a lens L3 (a second lens component) having a positive refractive power that is arranged close to the cemented lens CL1 on an image side of the cemented lens CL1 and that has a meniscus lens shape with a concave surface facing the object side. The first lens group G1 further includes a cemented lens CL2 that includes lenses L6 and L8 having a positive refractive power and a lens L7 having a negative refractive power that is made of a higher-dispersion material than the material of the lenses L6 and L8.

More specifically, the first lens group G1 includes, in order from the object side, a cemented lens CL1 that is configured of a plano-convex lens (a lens L1) with a plane surface facing the object side and a meniscus lens (a lens L2) with a concave surface facing the object side, a meniscus lens (a lens L3) with a concave surface facing the object side, a meniscus lens (a lens L4) with a concave surface facing the object side, a biconvex lens (a lens L5), and a cemented lens CL2 that is configured of a biconvex lens (a lens L6), a biconcave lens (a lens L7), and a biconvex lens (a lens L8). In FIG. 2, an emission filter F that interrupts excitation light is arranged between the lens L4 and the lens L5.

The second lens group G2 includes two or more positive lens components (a cemented lens CL3 and a cemented lens CL4), and the second lens group G2 further includes a meniscus lens component (a cemented lens CL6) with a concave surface facing the image side.

More specifically, the second lens group G2 includes, in order from the object side, a cemented lens CL3 that is configured of a meniscus lens (a lens L9) with a concave surface facing the image side and a biconvex lens (a lens L10), a cemented lens CL4 that is configured of a meniscus lens (a lens L11) with a concave surface facing the image side and a biconvex lens (a lens L12), a cemented lens CL5 that is configured of a meniscus lens (a lens L13) with a concave surface facing the image side and a meniscus lens (a lens L14) with a concave surface facing the image side, a cemented lens CL6 that is configured of a meniscus lens (a lens L15) with a concave surface facing the image side and a meniscus lens (a lens L16) with a concave surface facing the image side, a biconcave lens (a lens L17), a cemented lens CL7 that is configured of a meniscus lens (a lens L18) with a concave surface facing the object side and a meniscus lens (a lens L19) with a concave surface facing the object side, a meniscus lens (a lens L20) with a concave surface facing the object side, and a cemented lens CL8 that is configured of a meniscus lens (a lens L21) with a concave surface facing the image side and a meniscus lens (a lens L22) with a concave surface facing the image side.

The third lens group G3 includes a positive lens (a lens L23) and a negative lens (a lens L24). More specifically, the third lens group includes, in order from the object side, a cemented lens CL9 that is configured of a biconvex lens (a lens L23) and a biconcave lens (a lens L24).

Various types of data of the microscope optical system 1 are described below. $|\beta|$ represents a lateral magnification of the microscope optical system 1, and IH represents image height. $f_{G2}$ represents a focal length of the second lens group G2, and fG3 represents a focal length of the third lens group G3.

NA=1.35, $|\beta|$=10.60, IH=7.95mm, $\beta_{G3}$=0.71, f=7.28 mm, $f_{G1}$=21.428 mm, $f_{G2}$=197.413 mm, $f_{G3}$=−823.689 mm, $f_{G23}$=132.996 mm, $f_{L1}$=−416.940 mm, $f_{U2}$=78.814 mm, $f_{Ua}$=171.639 mm, $f_{Ub}$=170.091 mm, $r_{11}$=−6.1742 mm, $r_{12}$=−11.6703 mm, $d_{o12}$=12.706 mm, $D_{G23}$=55.208 mm, $D_{G3i}$=21.007 mm, $\Phi_{G1i}$=66.66 mm, $\Phi_{G2i}$=27.76 mm, $h_{max}$=33.32 mm, $h_{L11}$=2.05 mm, $h_{2Gi}$=13.89 mm Lens data of the microscope optical system 1 is described below. INF in the lens data represents infinity (∞)

| s | r | d | nd | vd | er |
|---|---|---|---|---|---|
| 1(Object plane) | INF | 0.000 | 1.51486 | 41.00 | |
| 2 | INF | 0.170 | 1.52347 | 54.45 | 0.76 |
| 3 | INF | 0.500 | 1.51486 | 41.00 | 1.09 |
| 4 | INF | 0.732 | 1.51635 | 64.14 | 2.10 |
| 5 | −6.1742 | 11.303 | 1.88306 | 40.76 | 2.51 |
| 6 | −11.6703 | 0.163 | 1 | | 10.36 |
| 7 | −41.0219 | 22.751 | 1.56910 | 71.30 | 14.56 |
| 8 | −25.7359 | 0.100 | 1 | | 23.09 |
| 9 | −52.4882 | 5.587 | 1.56910 | 71.30 | 25.88 |
| 10 | −39.8121 | 0.100 | 1 | | 26.78 |
| 11 | INF | 2.000 | 1.52289 | 59.90 | 29.00 |
| 12 | INF | 0.100 | 1 | | 29.27 |
| 13 | 202.3513 | 4.569 | 1.84676 | 23.78 | 29.76 |
| 14 | −1368.5507 | 0.100 | 1 | | 29.85 |
| 15 | 8064.5161 | 14.718 | 1.43876 | 94.93 | 29.88 |
| 16 | −39.4561 | 2.100 | 1.63779 | 42.41 | 29.92 |
| 17 | 159.0457 | 16.552 | 1.43876 | 94.93 | 33.10 |
| 18 | −51.8791 | 0.100 | 1 | | 33.33 |
| 19 | 98.5222 | 2.000 | 1.63779 | 42.41 | 33.59 |
| 20 | 47.4192 | 17.967 | 1.43876 | 94.93 | 32.42 |
| 21 | −120.1836 | 0.100 | 1 | | 32.40 |

-continued

| s | r | d | nd | vd | er |
|---|---|---|---|---|---|
| 22 | 54.4885 | 2.000 | 1.75504 | 52.32 | 30.13 |
| 23 | 32.4026 | 17.085 | 1.43876 | 94.93 | 27.27 |
| 24 | −251.4964 | 0.100 | 1 | | 27.14 |
| 25 | 63.4796 | 2.000 | 1.63779 | 42.41 | 25.06 |
| 26 | 29.1973 | 9.720 | 1.43876 | 94.93 | 22.44 |
| 27 | 158.1978 | 0.100 | 1 | | 22.24 |
| 28 | 20.2826 | 12.120 | 1.49702 | 81.54 | 18.73 |
| 29 | 65.3505 | 2.782 | 1.63779 | 42.41 | 17.28 |
| 30 | 13.0750 | 9.337 | 1 | | 11.79 |
| 31 | −38.4122 | 1.026 | 1.88306 | 40.76 | 11.78 |
| 32 | 44.6574 | 6.963 | 1 | | 12.03 |
| 33 | −16.5391 | 2.724 | 1.56910 | 71.30 | 12.07 |
| 34 | −61.8322 | 4.5093 | 1.63779 | 42.41 | 15.67 |
| 35 | −26.0988 | 0.210 | 1 | | 16.19 |
| 36 | −141.6531 | 6.114 | 1.88306 | 40.76 | 18.40 |
| 37 | −37.0228 | 0.1 | 1 | | 19.03 |
| 38 | 33.0053 | 16.954 | 1.60566 | 43.70 | 19.82 |
| 39 | 111.1346 | 11.4346 | 1.5691 | 71.30 | 17.14 |
| 40 | 26.2943 | 55.208 | 1 | | 13.88 |
| 41 | 21.2159 | 16.2552 | 1.63779 | 42.41 | 12.47 |
| 42 | −31.0485 | 1.000 | 1.80106 | 34.97 | 9.45 |
| 43 | 19.9490 | 21.007 | 1 | | 8.49 |
| 44(Image plane) | INF | | | | |

In this lens data, s represents a surface number, r represents a radius of curvature (mm), d represents a spacing (mm), nd represents a refractive index with respect to a d-line, vd represents an Abbe number, and er represents an effective radius (mm). These symbols are similarly used in the examples below. Surfaces indicated by surface numbers s1, s2, and s3 are respectively an object plane, a surface on the object side of a cover glass CG, and a surface of the image side of the cover glass CG. Surfaces indicated by surface numbers s4, s43, and s44 are respectively a lens surface closest to an object, a lens surface closest to an image, and an image plane in the microscope optical system 1. Surfaces indicated by surface numbers s11 and s12 are surfaces of the emission filter. As an example, a spacing d1 indicates the length on an optical axis from a surface indicated by a surface number s1 to a surface indicated by a surface number s2.

The microscope optical system 1 satisfies conditional expressions (1) to (13), as described below.

$$NA=1.35 \tag{1}$$

$$\beta_{G3}=0.71 \tag{2}$$

$$D_{G3f}/D_{G23}=0.4 \tag{3}$$

$$D_{G23}/h_{max}=1.66 \tag{4}$$

$$\Phi_{G2f}/\Phi_{G1i}=0.42 \tag{5}$$

$$h_{2Gf}/h_{max}=0.42 \tag{6}$$

$$h_{L11}/r_{11}=-0.33 \tag{7}$$

$$f_{G1}/|f_{G23}|=0.16 \tag{8}$$

$$f_{G1}/f_{U2}=0.27 \tag{9}$$

$$f_{G1}/f_{Ua}=0.12 \tag{10}$$

$$f_{G1}/f_{Ub}=0.13 \tag{11}$$

$$r_{12}/d_{o12}=-0.92 \tag{12}$$

$$f_{G1}/f_{L1}=-0.05 \tag{13}$$

Figure 3:
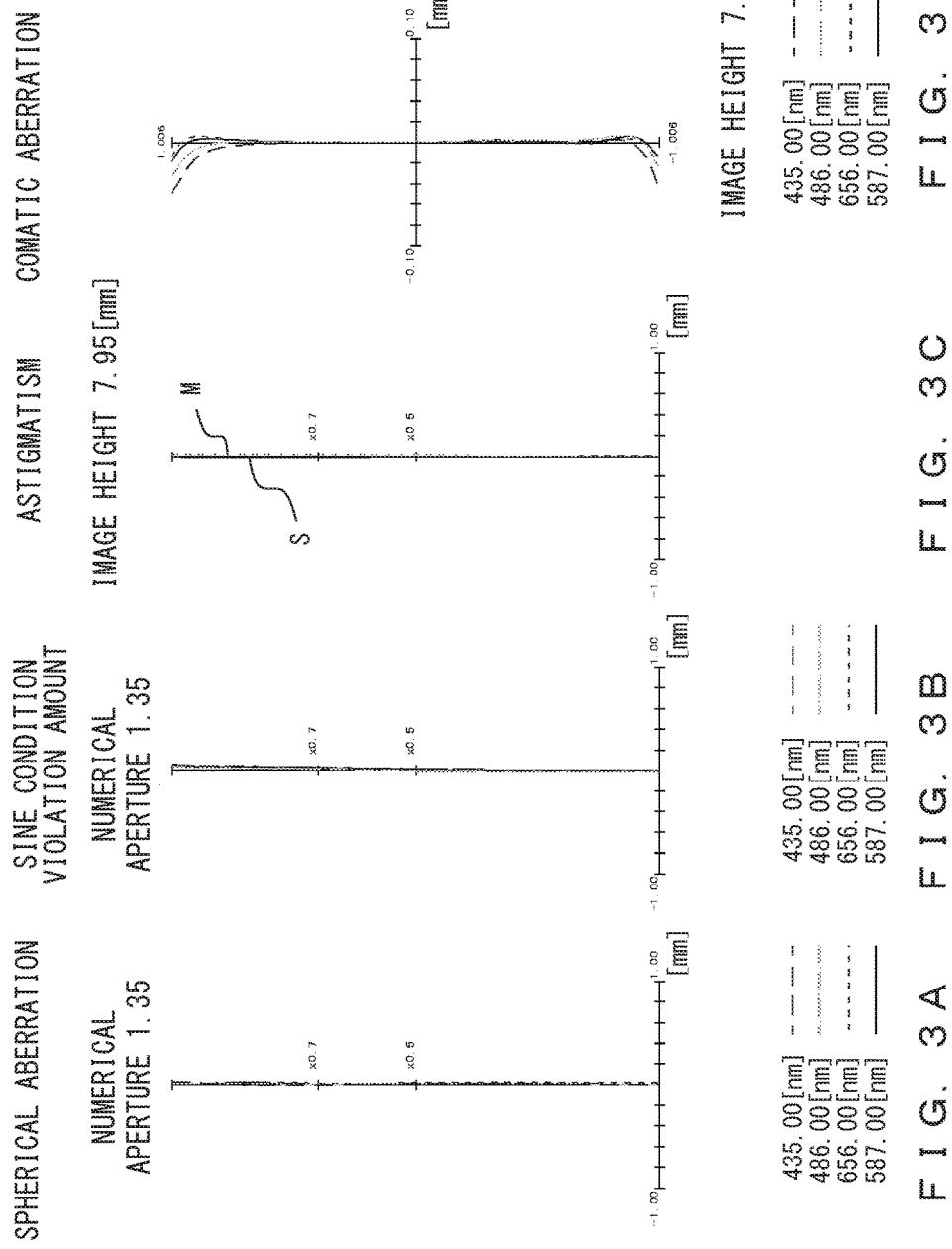
FIGS. 3A to 3D illustrate aberrations of the microscope optical system 1 illustrated in FIG. 1.

FIGS. 3A to 3D illustrate aberrations on the image plane of the microscope optical system 1 illustrated in FIG. 2. FIG. 3A illustrates a spherical aberration. FIG. 3B illustrates a sine condition violation amount. FIG. 3C illustrates astigmatism. FIG. 3D illustrates a comatic aberration. In these diagrams, "M" represents a meridional component, and "S" represents a sagittal component. As illustrated in FIGS. 3A to 3D, in the microscope optical system 1, aberrations are satisfactorily corrected, and a satisfactory imaging performance is achieved.

EXAMPLE 2

Figure 4:
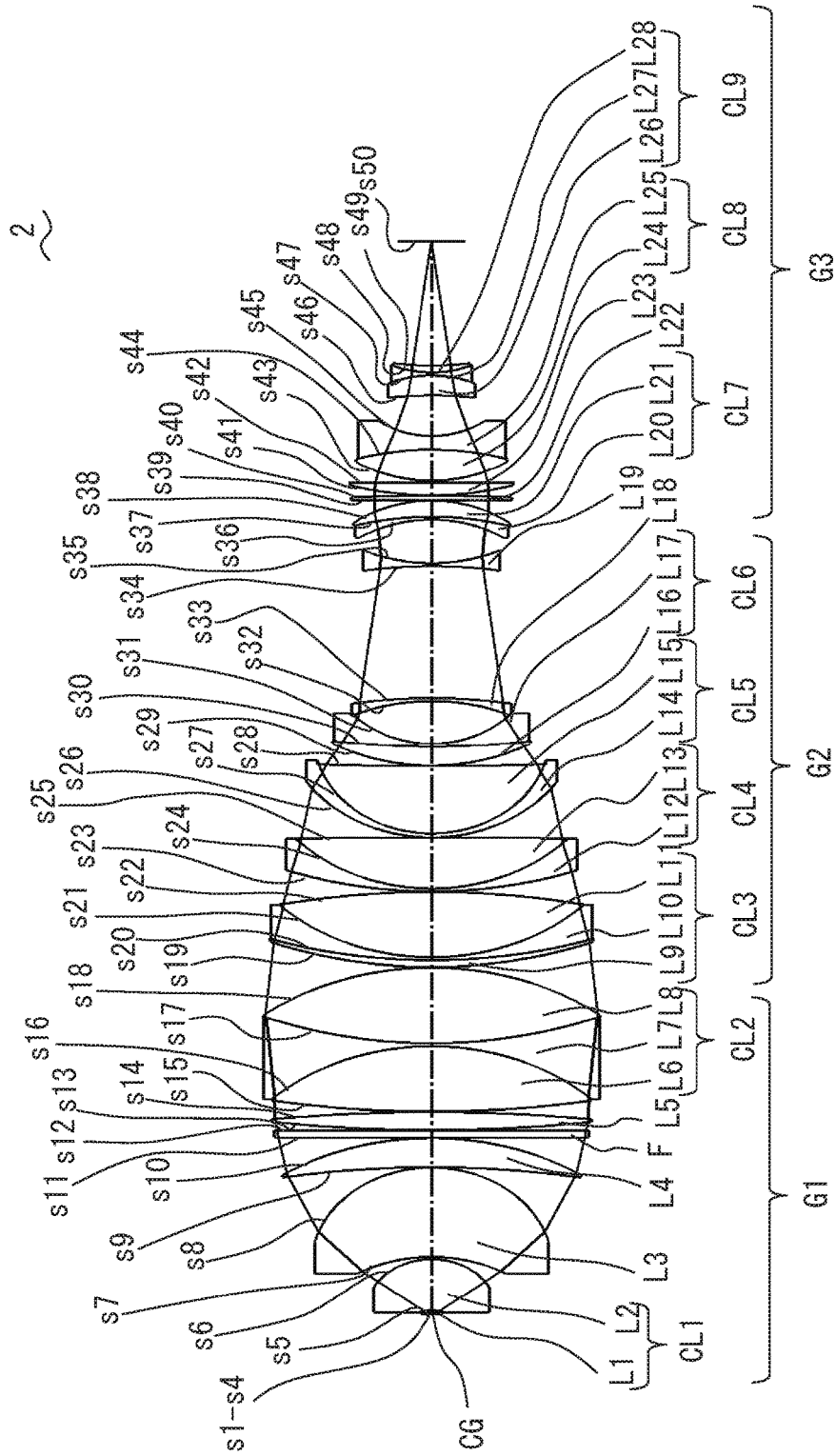
FIG. 4 is a cross-sectional view of a microscope optical system 2 in Example 2 of the present invention.

FIG. 4 is a cross-sectional view of a microscope optical system 2 in this example. The microscope optical system 2 is an optical system that condenses light emitted from an object point on an image plane, and the microscope optical system 2 is configured of a first lens group G1 having a positive refractive power, a second lens group G2 having a positive refractive power, and a third lens group G3 having a negative refractive power in order from an object side. The microscope optical system 2 is an immersion type microscope optical system.

The first lens group G1 includes a cemented lens CL1 (a first lens component) that includes a lens L2 (a first meniscus lens) that has a meniscus shape with a concave surface facing the object side, and a lens L3 (a second lens component) having a positive refractive power that is arranged close to the cemented lens CL1 on an image side of the cemented lens CL1 and that has a meniscus lens shape with a concave surface facing the object side. The first lens group G1 further includes a cemented lens CL2 that includes lenses L6 and L8 having a positive refractive power and a lens L7 having a negative refractive power that is made of a higher-dispersion material than the material of the lenses L6 and L8.

More specifically, the first lens group G1 includes, in order from the object side, a cemented lens CL1 that is configured of a plano-convex lens (a lens L1) with a plane surface facing the object side and a meniscus lens (a lens L2) with a concave surface facing the object side, a meniscus lens (a lens L3) with a concave surface facing the object side, a meniscus lens (a lens L4) with a concave surface facing the object side, a biconvex lens (a lens L5), and a cemented lens CL2 that is configured of a biconvex lens (a lens L6), a biconcave lens (a lens L7), and a biconvex lens (a lens L8). In FIG. 4, an emission filter F that interrupts excitation light is arranged between the lenses L4 and L5.

The second lens group G2 includes two or more positive lens components (cemented lenses CL3 and CL4), and the second lens group G2 further includes a meniscus lens component (a cemented lens CL6) with a concave surface facing the image side.

More specifically, the second lens group G2 includes, in order from the object side, a cemented lens CL3 that is configured of a meniscus lens (a lens L9) with a concave surface facing the image side, a meniscus lens (a lens L10) with a concave surface facing the image side, and a biconvex lens (a lens L11), a cemented lens CL4 that is configured of a meniscus lens (a lens L12) with a concave surface facing the image side and a biconvex lens (a lens L13), a cemented lens CL5 that is configured of a meniscus lens (a lens L14) with a concave surface facing the image side and a meniscus lens (a lens L15) with a concave surface facing the image side, a cemented lens CL6 that is configured of a meniscus lens (a lens L16) with a concave surface facing the image side and a meniscus lens (a lens L17) with a concave surface facing the image side, and a meniscus lens (a lens L18) with a concave surface facing the object side.

The third lens group G3 includes a positive lens (a lens L24) and a negative lens (a lens L25).

More specifically, the third lens group includes, in order from the object side, a biconcave lens (a lens L19), a cemented lens CL7 that is configured of a meniscus lens (a lens L20) with a concave surface facing the object side and a meniscus lens (a lens L21) with a concave surface facing the object side, a meniscus lens (a lens L22) with a concave surface facing the object side, a meniscus lens (a lens L23) with a concave surface facing the image side, a cemented lens CL8 that is configured of a biconvex lens (a lens L24) and a biconcave lens (a lens L25), and a cemented lens CL9 that is configured of a meniscus lens (a lens L26) with a concave surface facing the object side, a biconcave lens (a lens L27), and a meniscus lens (a lens L28) with a concave surface facing the image side.

Various types of data of the microscope optical system 2 are described below.

NA=1.35, $|\beta|$=10.59, IH=7.95 mm, $\beta_{G3}$=1.03, f=6.93 mm, $f_{G1}$=24.773 mm, $f_{G2}$=628.959 mm, $f_{G3}$=−126.594 mm, $f_{G23}$=−726.900 mm, $f_{L1}$=−49.698 mm, $f_{U2}$=113.104 mm, $f_{Ua}$=2880.078 mm, $f_{Ub}$=94.117 mm, $r_{11}$=−6.4511 mm, $r_{12}$=−15.4630 mm, $d_{o12}$=15.552 mm, $D_{G23}$=36.808 mm, $D_{G3i}$=34.714 mm, $\Phi_{G1i}$=76.96 mm, $\Phi_{G2i}$=36.09 mm, $h_{max}$=38.43 mm, $h_{L11}$=1.80 mm, $h_{2Gi}$=18.00 mm Lens data of the microscope optical system 2 is described below.

| Microscope optical system 2 | | | | | |
|---|---|---|---|---|---|
| s | r | d | nd | vd | er |
| 1(Object plane) | INF | 0.000 | 1.51486 | 41.00 | |
| 2 | INF | 0.170 | 1.52347 | 54.45 | 0.74 |
| 3 | INF | 0.500 | 1.51486 | 41.00 | 1.07 |
| 4 | INF | 0.512 | 1.51635 | 64.14 | 2.07 |
| 5 | −6.4511 | 14.370 | 1.88306 | 40.76 | 2.27 |
| 6 | −15.4630 | 0.671 | 1 | | 12.92 |
| 7 | −33.6237 | 24.958 | 1.56910 | 71.30 | 16.81 |
| 8 | −28.0325 | 0.100 | 1 | | 26.57 |
| 9 | −203.5789 | 8.140 | 1.56910 | 71.30 | 33.75 |
| 10 | −62.7471 | 0.100 | 1 | | 34.05 |
| 11 | INF | 2.000 | 1.52290 | 59.89 | 35.83 |
| 12 | INF | 0.100 | 1 | | 36.06 |
| 13 | 306.7391 | 5.076 | 1.67276 | 32.10 | 36.46 |
| 14 | −335.2667 | 0.100 | 1 | | 36.51 |
| 15 | 224.5778 | 18.272 | 1.43876 | 94.93 | 36.60 |
| 16 | −53.7158 | 0.800 | 1.63779 | 42.41 | 36.56 |
| 17 | 104.0431 | 21.320 | 1.43876 | 94.93 | 38.30 |
| 18 | −63.7105 | 0.100 | 1 | | 38.48 |
| 19 | 102.8362 | 1.900 | 1.84676 | 23.78 | 36.91 |
| 20 | 120.4805 | 0.800 | 1.75504 | 52.32 | 36.74 |
| 21 | 49.6803 | 18.283 | 1.43876 | 94.93 | 34.79 |
| 22 | −175.8180 | 0.100 | 1 | | 34.76 |
| 23 | 98.1720 | 0.800 | 1.75504 | 52.32 | 33.09 |
| 24 | 42.4238 | 14.175 | 1.43876 | 94.93 | 30.94 |
| 25 | −5115.0895 | 0.100 | 1 | | 30.86 |
| 26 | 34.7482 | 1.141 | 1.63779 | 42.41 | 28.58 |
| 27 | 27.2708 | 18.873 | 1.43876 | 94.93 | 25.89 |
| 28 | 703.1360 | 0.109 | 1 | | 25.65 |
| 29 | 45.2239 | 5.369 | 1.49702 | 81.54 | 22.43 |
| 30 | 173.9100 | 0.800 | 1.63779 | 42.41 | 21.96 |
| 31 | 24.2196 | 12.023 | 1 | | 18.03 |
| 32 | −42.8190 | 0.800 | 1.49702 | 81.54 | 18.03 |
| 33 | −111.4467 | 36.808 | 1 | | 18.05 |
| 34 | −98.1191 | 0.8 | 1.43876 | 94.93 | 15.33 |
| 35 | 36.5095 | 12.191 | 1 | | 15.32 |
| 36 | −29.7980 | 0.8 | 1.43876 | 94.93 | 16.19 |
| 37 | −64.0677 | 4.501 | 1.63779 | 42.41 | 17.27 |
| 38 | −29.2843 | 0.100 | 1 | | 17.60 |
| 39 | −11880.0000 | 1.307 | 1.88306 | 40.76 | 18.15 |
| 40 | −337.4047 | 0.100 | 1 | | 18.20 |
| 41 | 65.6698 | 3.5938 | 1.88306 | 40.76 | 18.35 |
| 42 | 58480.0000 | 0.500 | 1 | | 18.24 |
| 43 | 31.4270 | 8.7784 | 1.71303 | 53.87 | 17.06 |
| 44 | −58.8374 | 3.819 | 1.5691 | 71.30 | 16.54 |
| 45 | 20.1176 | 11.383 | 1 | | 11.86 |
| 46 | −79.6584 | 5.566 | 1.63779 | 42.41 | 9.55 |
| 47 | −23.6041 | 0.8 | 1.80106 | 34.97 | 8.91 |
| 48 | 22.3172 | 1.9637 | 1.63779 | 42.41 | 8.52 |
| 49 | 64.7513 | 34.714 | 1 | | 8.47 |
| 50(Image plane) | INF | | | | |

The microscope optical system 2 satisfies conditional expressions (1) to (13), as described below.

$$NA=1.35 \quad (1)$$

$$\beta_{G3}=1.03 \quad (2)$$

$$D_{G3i}/D_{G23}=0.9 \quad (3)$$

$$D_{G23}/h_{max}=0.96 \quad (4)$$

$$\Phi_{G2i}/\Phi_{G1i}=0.47 \quad (5)$$

$$h_{2Gi}/h_{max}=0.47 \quad (6)$$

$$h_{L11}/r_{11}=-0.28 \quad (7)$$

$$f_{G1}/|f_{G23}|=0.03 \quad (8)$$

$$f_{G1}/f_{U2}=0.22 \quad (9)$$

$$f_{G1}/f_{Ua}=0.01 \quad (10)$$

$$f_{G1}/f_{Ub}=0.26 \quad (11)$$

$$r_{12}/d_{o12}=-0.99 \quad (12)$$

$$f_{G1}/f_{L1}=-0.50 \quad (13)$$

Figure 5:
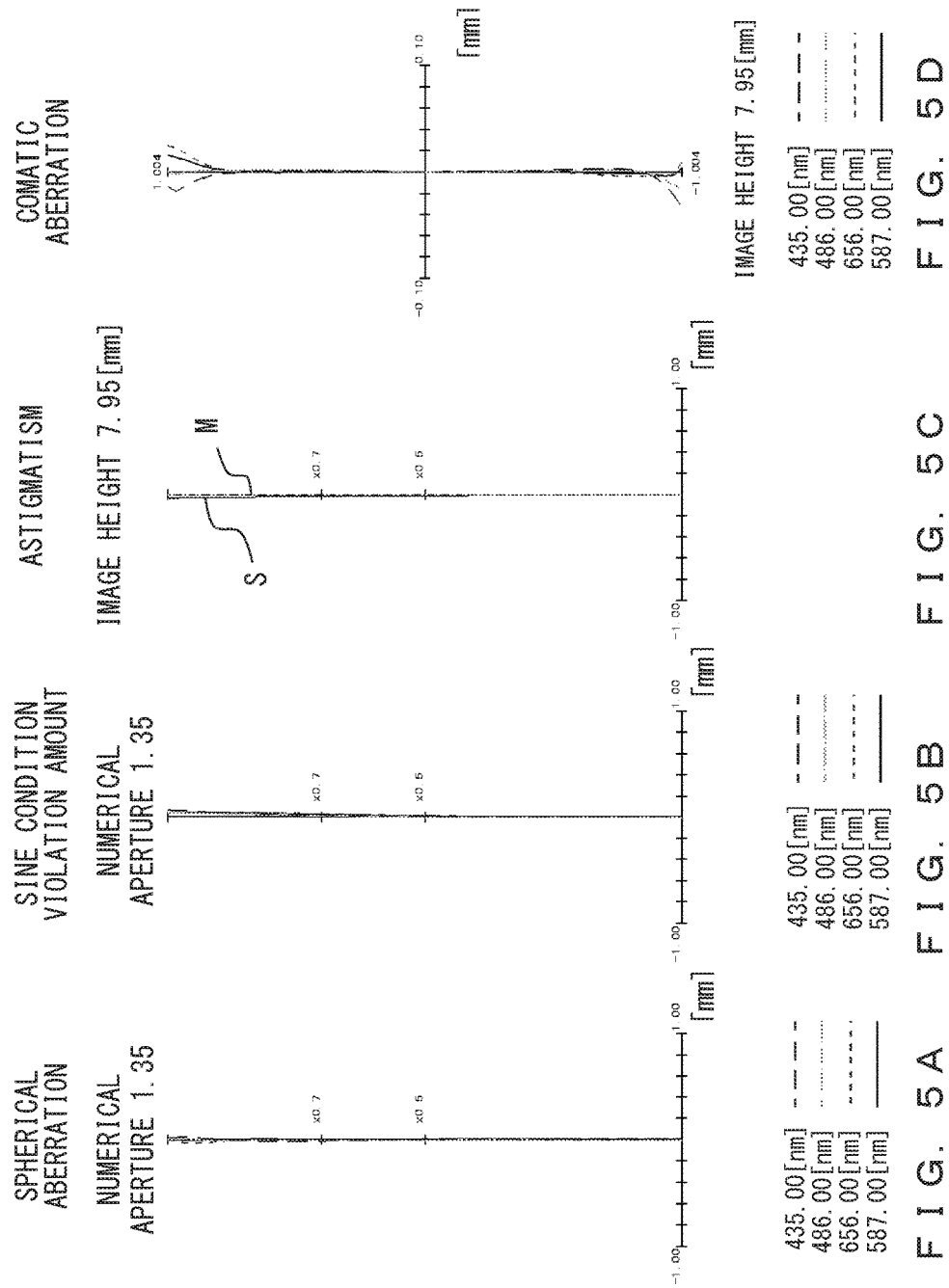
FIGS. 5A to 5D illustrate aberrations of the microscope optical system 2 illustrated in FIG. 4.

FIGS. 5A to 5D illustrate aberrations on the image plane of the microscope optical system 2 illustrated in FIG. 4. FIG. 5A illustrates a spherical aberration. FIG. 5B illustrates a sine condition violation amount. FIG. 5C illustrates astigmatism. FIG. 5D illustrates a comatic aberration. In these diagrams, "M" represents a meridional component, and "S" represents a sagittal component. As illustrated in FIGS. 5A to 5D, in the microscope optical system 2, aberrations are satisfactorily corrected, and a satisfactory imaging performance is achieved.

EXAMPLE 3

FIG. 6 is a cross-sectional view of a microscope optical system 3 in this example. The microscope optical system 3 is an optical system that condenses light emitted from an object point on an image plane, and the microscope optical system 3 is configured of a first lens group G1 having a positive refractive power, a second lens group G2 having a negative refractive power, and a third lens group G3 having a negative refractive power in order from an object side. The microscope optical system 3 is an immersion type microscope optical system.

The first lens group G1 includes a cemented lens CL1 (a first lens component) that includes a lens L2 (a first meniscus lens) having a meniscus shape with a concave surface facing the object side, and a lens L3 (a second lens component) having a positive refractive power that is arranged close to the cemented lens CL1 on an image side of the cemented lens CL1 and that has a meniscus lens shape with a concave surface facing the object side. The first lens group G1 further includes a cemented lens CL2 that includes lenses L6 and L8 having a positive refractive power and a lens L7 having a negative refractive power that is made of a higher-dispersion material than the material of the lenses L6 and L8.

More specifically, the first lens group G1 includes, in order from the object side, a cemented lens CL1 that is configured of a plano-convex lens (a lens L1) with a plane surface facing the object side and a meniscus lens (a lens L2) with a concave surface facing the object side, a meniscus lens (a lens L3) with a concave surface facing the object side, a biconvex lens (a lens L4), a biconvex lens (a lens L5), and a cemented lens CL2 that is configured of a biconvex lens (a lens L6), a biconcave lens (a lens L7), and a biconvex lens (a lens L8). In FIG. 6, an emission filter F that interrupts excitation light is arranged between the lenses L4 and L5.

The second lens group G2 includes two or more positive lens components (cemented lenses CL3 and CL5), and the second lens group G2 further includes a meniscus lens component (a cemented lens CL6) with a concave surface facing the image side.

More specifically, the second lens group G2 includes, in order from the object side, a cemented lens CL3 that is configured of a meniscus lens (a lens L9) with a concave surface facing the image side and a biconvex lens (a lens L10), a cemented lens CL4 that is configured of a meniscus lens (a lens L11) with a concave surface facing the image side and a meniscus lens (a lens L12) with a concave surface facing the image side, a cemented lens CL5 that is configured of a meniscus lens (a lens L13) with a concave surface facing the image side and a meniscus lens (a lens L14) with a concave surface facing the image side, a cemented lens CL6 that is configured of a meniscus lens (a lens L15) with a concave surface facing the image side and a meniscus lens (a lens L16) with a concave surface facing the image side, and a meniscus lens (a lens L17) with a concave surface facing the object side.

The third lens group G3 includes a positive lens (a lens L20) and a negative lens (a lens L21).

More specifically, the third lens group G3 includes, in order from the object side, a biconcave lens (a lens L18), a biconvex lens (a lens L19), a cemented lens CL7 that is configured of a biconvex lens (a lens L20) and a biconcave lens (a lens L21), and a cemented lens CL8 that is configured of a biconcave lens (a lens L22) and a meniscus lens (a lens L23) with a concave surface facing the image side.

Various types of data of the microscope optical system 3 are described below.

NA=1.1, |β|=10.60, IH=7.95 mm, $β_{G3}$=0.81, f=5.70 mm, $f_{G1}$=23.828 mm, $f_{G2}$=−666.667 mm, $f_{G3}$=−173.190 mm, $f_{G23}$=−159.051 mm, $f_{L1}$=46.953 mm, $f_{U2}$=121.416 mm, $f_{Ua}$=293.539 mm, $f_{Ub}$=90.419 mm, $r_{11}$=−14.1824 mm, $r_{12}$=−15.5683 mm, $d_{o12}$=16.057 mm, $D_{G23}$=20.083 mm, $D_{G3i}$=31.461 mm, $Φ_{G1i}$=56.48 mm, $Φ_{G2i}$=42.71 mm, $h_{max}$=28.24 mm, $h_{L11}$=1.74 mm, $h_{2Gi}$=13.07 mm Lens data of the microscope optical system 3 is described below.

| Microscope optical system 3 | | | | | |
|---|---|---|---|---|---|
| s | r | d | nd | vd | er |
| 1(Object plane) | INF | 0.000 | 1.51486 | 41.00 | |
| 2 | INF | 0.170 | 1.52347 | 54.45 | 0.75 |
| 3 | INF | 0.500 | 1.51486 | 41.00 | 0.93 |
| 4 | INF | 1.076 | 1.51635 | 64.14 | 1.47 |
| 5 | −14.1824 | 14.311 | 1.88306 | 40.76 | 2.41 |
| 6 | −15.5683 | 0.482 | 1 | | 10.74 |
| 7 | −35.5773 | 24.859 | 1.56910 | 71.30 | 12.50 |
| 8 | −29.4368 | 0.842 | 1 | | 22.24 |
| 9 | 805.2777 | 9.700 | 1.56910 | 71.30 | 25.93 |
| 10 | −90.9917 | 3.868 | 1 | | 26.90 |
| 11 | INF | 2.000 | 1.52289 | 59.90 | 27.85 |
| 12 | INF | 0.100 | 1 | | 28.01 |
| 13 | 166.2986 | 4.365 | 1.67276 | 32.10 | 28.31 |
| 14 | −302.4966 | 0.100 | 1 | | 28.31 |
| 15 | 332.2263 | 8.781 | 1.43876 | 94.93 | 28.15 |
| 16 | −59.2521 | 2.000 | 1.63779 | 42.41 | 28.12 |
| 17 | 86.0405 | 11.647 | 1.43876 | 94.93 | 28.20 |
| 18 | −67.8512 | 0.100 | 1 | | 28.24 |
| 19 | 76.9804 | 2.000 | 1.75504 | 52.32 | 27.39 |
| 20 | 40.0262 | 11.500 | 1.43876 | 94.93 | 26.05 |
| 21 | −302.3318 | 0.100 | 1 | | 25.99 |
| 22 | 107.0438 | 2.000 | 1.75504 | 52.32 | 25.37 |
| 23 | 39.6122 | 8.514 | 1.43876 | 94.93 | 24.04 |
| 24 | 826.8075 | 0.100 | 1 | | 23.99 |
| 25 | 31.1155 | 2.000 | 1.63779 | 42.41 | 23.09 |
| 26 | 24.7353 | 20.083 | 1.43876 | 94.93 | 21.35 |
| 27 | 219.9035 | 0.494 | 1 | | 18.66 |
| 28 | 36.2738 | 4.821 | 1.49702 | 81.54 | 16.99 |
| 29 | 388.5025 | 1.770 | 1.63779 | 42.41 | 16.56 |
| 30 | 21.5497 | 12.712 | 1 | | 13.86 |
| 31 | −31.9133 | 0.800 | 1.49702 | 81.54 | 12.93 |
| 32 | −95.6489 | 29.556 | 1 | | 13.01 |
| 33 | −132.8169 | 0.800 | 1.43876 | 94.93 | 12.22 |
| 34 | 34.3345 | 11.22 | 1 | | 12.25 |
| 35 | 54.2902 | 3.525 | 1.88306 | 40.76 | 14.35 |
| 36 | −121.8691 | 0.6 | 1 | | 14.32 |
| 37 | 29.6073 | 9.5728 | 1.71303 | 53.87 | 13.54 |
| 38 | −48.7177 | 7.430 | 1.56910 | 71.30 | 12.08 |
| 39 | 17.0454 | 6.6958 | 1 | | 8.05 |
| 40 | −19.0111 | 0.800 | 1.63779 | 42.41 | 7.13 |
| 41 | 17.5946 | 1.8218 | 1.80106 | 34.97 | 7.14 |
| 42 | 60.2158 | 31.461 | 1 | | 7.11 |
| 43 | INF | | | | |

The microscope optical system 3 satisfies conditional expressions (1) to (13), as described below.

$$NA=1.1 \quad (1)$$

$$β_{G3}=0.81 \quad (2)$$

$$D_{G3i}/D_{G23}=1.6 \quad (3)$$

$$D_{G23}/h_{max}=0.71 \quad (4)$$

$$Φ_{G2i}/Φ_{G1i}=0.76 \quad (5)$$

$$h_{2Gi}/h_{max}=0.46 \quad (6)$$

$$h_{L11}/r_{11}=-0.12 \quad (7)$$

$$f_{G1}/|f_{G23}|=0.15 \quad (8)$$

$$f_{G1}/f_{U2}=0.20 \quad (9)$$

$$f_{G1}/f_{Ua}=0.08 \quad (10)$$

$$f_{G1}/f_{Ub}=0.26 \quad (11)$$

$$r_{12}/d_{o12}=-0.97 \quad (12)$$

$$f_{G1}/f_{L1}=0.51 \quad (13)$$

Figure 7:
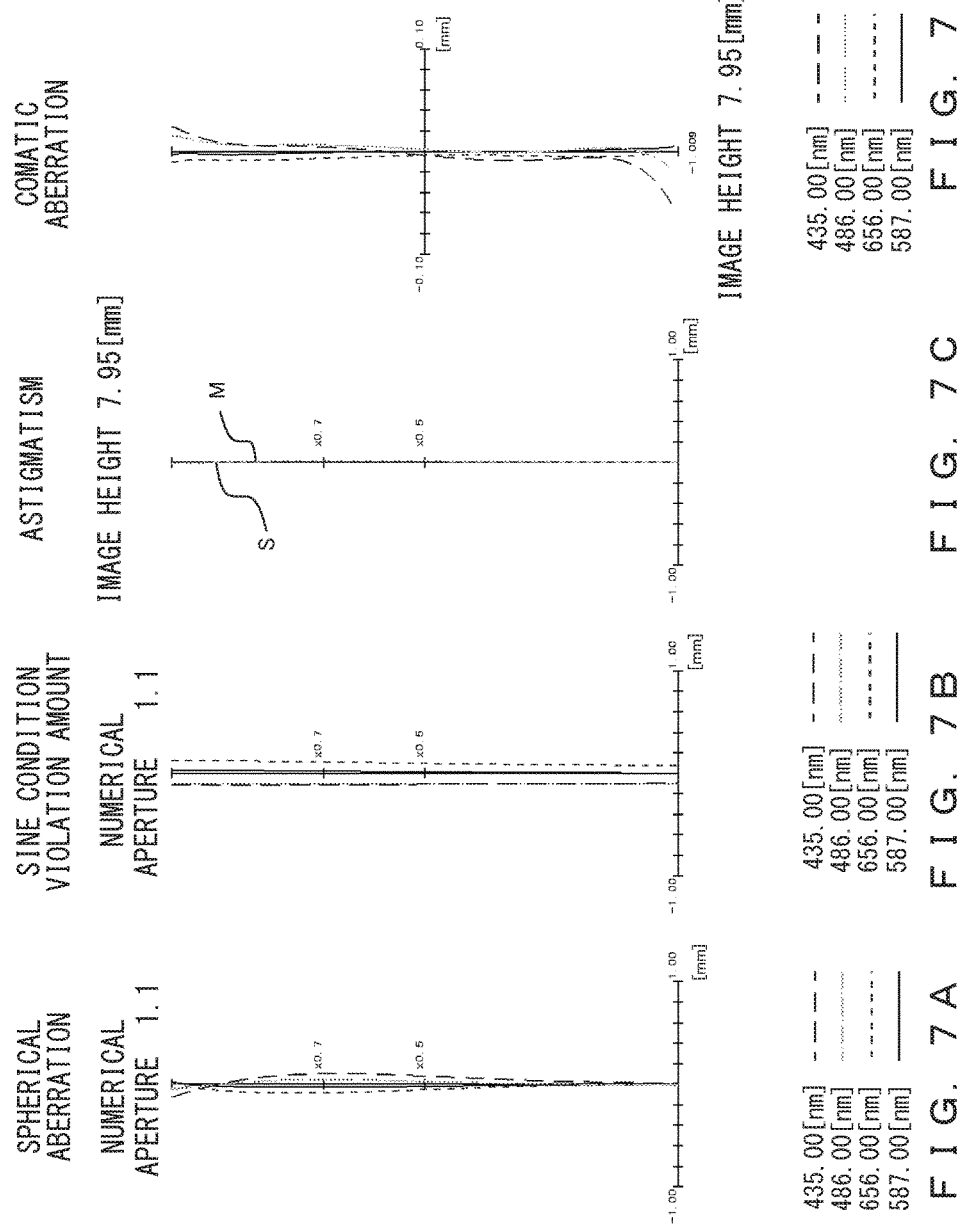
FIGS. 7A to 7D illustrate aberrations of the microscope optical system 3 illustrated in FIG. 6.

FIGS. 7A to 7D illustrate aberrations on the image plane of the microscope optical system 3 illustrated in FIG. 6. FIG. 7A illustrates a spherical aberration. FIG. 7B illustrates a sine condition violation amount. FIG. 7C illustrates astigmatism. FIG. 7D illustrates a comatic aberration. In these diagrams, "M" represents a meridional component, and "S" represents a sagittal component. As illustrated in FIGS. 7A to 7D, in the microscope optical system 3, aberrations are satisfactorily corrected, and a satisfactory imaging performance is achieved.

EXAMPLE 4

Figure 8:
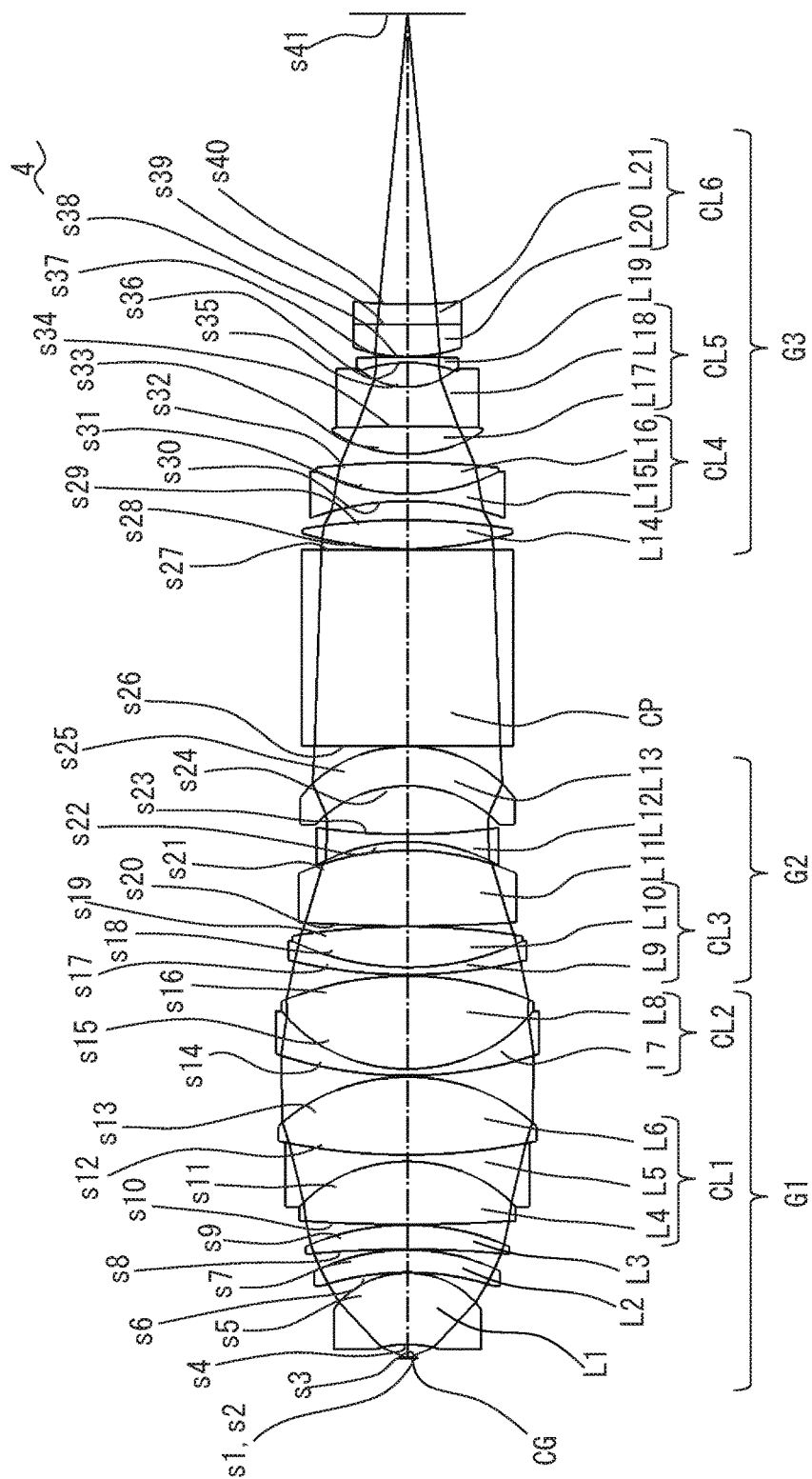
FIG. 8 is a cross-sectional view of a microscope optical system 4 in Example 4 of the present invention.

FIG. 8 is a cross-sectional view of a microscope optical system 4 in this example. The microscope optical system 4 is an optical system that condenses light emitted from an object point on an image plane, and the microscope optical system 4 is configured of a first lens group G1 having a positive refractive power, a second lens group G2 having a negative refractive power, and a third lens group G3 having a positive refractive power in order from an object side. The microscope optical system 4 is a dry microscope optical system.

The first lens group G1 includes a lens L1 (a first meniscus lens; a first lens component) having a meniscus shape with a concave surface facing the object side, and a lens L2 (a second lens component) having a positive refractive power that is arranged close to the lens L1 on an image side of the lens L1 and that has a meniscus lens shape with a concave surface facing the object side. The first lens group G1 further includes a cemented lens CL1 that includes lenses L4 and L6 having a positive refractive power and a lens L5 having a negative refractive power that is made of a higher-dispersion material than the material of the lenses L4 and L6.

More specifically, the first lens group G1 includes, in order from the object side, a meniscus lens (a lens L1) with a concave surface facing the object side, a meniscus lens (a Lens L2) with a concave surface facing the object side, a meniscus lens (a lens L3) with a concave surface facing the object side, a cemented lens CL1 that is configured of a biconvex lens (a lens L4), a biconcave lens (a lens L5), and a biconvex lens (a lens L6), and a cemented lens CL2 that is configured of a meniscus lens (a lens L7) with a concave surface facing the image side and a biconvex lens (a lens L8).

The second lens group G2 includes two or more positive lens components (a cemented lens CL3 and a lens L11). In FIG. 8, a cubic prism CP is arranged between the second lens group G2 and the third lens group G3.

More specifically, the second lens group G2 includes, in order from the object side, a cemented lens CL3 that is configured of a meniscus lens (a lens L9) with a concave surface facing the image side and a biconvex lens (a lens L10), a biconvex lens (a lens L11), a biconcave lens (a lens L12), and a meniscus lens (a lens L13) with a concave surface facing the object side.

The third lens group G3 includes a positive lens (a lens L17) and a negative lens (a lens L18).

More specifically, the third lens group includes, in order from the object side, a biconvex lens (a lens L14), a cemented lens CL4 that is configured of a biconcave lens (a lens L15) and a biconvex lens (a lens L16), a cemented lens CL5 that is configured of a biconvex lens (a lens L17) and a biconcave lens (a lens L18), a meniscus lens (a lens L19) with a concave surface facing the object side, and a cemented lens CL6 that is configured of a biconvex lens (a lens L20) and a biconcave lens (a lens L21).

Various types of data of the microscope optical system 4 are described below.

NA=0.9, $|\beta|$=10.60, IH=7.95 mm, $\beta_{G3}$=0.37, f=6.57 mm, $f_{G1}$=16.947 mm, $f_{G2}$=−124.562 mm, $f_{G3}$=922.257 mm, $f_{G23}$=−59.208 mm, $f_{L1}$=27.099 mm, $f_{U2}$=104.297 mm, $f_{Ua}$=104.981 mm, $f_{Ub}$=64.728 mm, $r_{11}$=−13.0731 mm, $r_{12}$=−11.7647 mm, $d_{o12}$=13.093 mm, $D_{G23}$=30.2 mm, $D_{G3i}$=44.467 mm, $\Phi_{G1i}$=33.32 mm, $\Phi_{G2i}$=28.04 mm, $h_{max}$=16.81 mm, $h_{L11}$=3.38 mm, $h_{2Gi}$=13.96 mm Lens data of the microscope optical system 4 is described below.

| Microscope optical system 4 | | | | | |
|---|---|---|---|---|---|
| s | r | d | nd | vd | er |
| 1(Object plane) | INF | 0.000 | 1 | | |
| 2 | INF | 0.150 | 1.52103 | 56.02 | 0.75 |
| 3 | INF | 2.027 | 1 | | 0.86 |
| 4 | −13.0731 | 10.915 | 1.88306 | 40.76 | 3.88 |
| 5 | −11.7647 | 0.100 | 1 | | 9.51 |
| 6 | −33.9927 | 3.419 | 1.88306 | 40.76 | 11.10 |
| 7 | −26.0000 | 0.110 | 1 | | 12.10 |
| 8 | −126.7745 | 3.703 | 1.49702 | 81.54 | 12.97 |
| 9 | −30.5189 | 0.110 | 1 | | 13.32 |
| 10 | 206.4974 | 9.609 | 1.43876 | 94.93 | 13.93 |
| 11 | −18.9811 | 1.000 | 1.63779 | 42.41 | 14.19 |
| 12 | 73.8361 | 11.893 | 1.43876 | 94.93 | 16.07 |
| 13 | −24.1358 | 0.220 | 1 | | 17.00 |
| 14 | 49.7276 | 1.000 | 1.63779 | 42.41 | 17.33 |
| 15 | 20.8827 | 14.221 | 1.43876 | 94.93 | 16.59 |
| 16 | −39.4928 | 0.210 | 1 | | 16.66 |
| 17 | 60.0663 | 1.100 | 1.63779 | 42.41 | 15.67 |
| 18 | 32.2216 | 6.243 | 1.43876 | 94.93 | 15.10 |
| 19 | −84.7381 | 0.100 | 1 | | 14.92 |
| 20 | 200.0000 | 11.560 | 1.43876 | 94.93 | 14.27 |
| 21 | −32.5169 | 1.317 | 1 | | 12.11 |
| 22 | −22.7869 | 1.100 | 1.74956 | 35.33 | 11.88 |
| 23 | 73.3543 | 7.413 | 1 | | 11.86 |
| 24 | −16.1290 | 6.000 | 1.73806 | 32.26 | 11.98 |
| 25 | −17.4216 | 0.100 | 1 | | 14.02 |
| 26 | INF | 30.000 | 1.52292 | 59.89 | 13.90 |
| 27 | INF | 0.100 | 1 | | 13.74 |
| 28 | 44.9208 | 4.392 | 1.84676 | 23.88 | 13.73 |
| 29 | −75.3103 | 2.908 | 1 | | 13.58 |
| 30 | −34.3442 | 1.100 | 1.49702 | 81.54 | 12.74 |
| 31 | 24.2617 | 4.799 | 1.63779 | 42.41 | 11.80 |
| 32 | −99.5836 | 1.264 | 1 | | 11.62 |
| 33 | 16.5829 | 4.253 | 1.49702 | 81.54 | 9.66 |
| 34 | −213.4739 | 6.000 | 1.84676 | 23.88 | 9.19 |
| 35 | 9.1156 | 3.747 | 1 | | 6.05 |
| 36 | −17.1469 | 0.800 | 1.88306 | 40.76 | 6.05 |
| 37 | −498.9898 | 0.100 | 1 | | 6.38 |
| 38 | 20.0714 | 5.000 | 1.88306 | 40.76 | 6.83 |
| 39 | −282.6302 | 3.000 | 1.49702 | 81.54 | 6.79 |
| 40 | 58.4345 | 44.467 | 1 | | 6.72 |
| 41 | INF | | | | |

The microscope optical system 4 satisfies conditional expressions (1) to (13), as described below.

NA=0.9 (1)

$\beta_{G3}$=0.37 (2)

$D_{G3i}/D_{G23}$=1.5 (3)

$D_{G23}/h_{max}$=1.80 (4)

$\Phi_{G2i}/\Phi_{G1i}$=0.84 (5)

$h_{2Gi}/h_{max}$=0.83 (6)

$h_{L11}/r_{11}$=−0.26 (7)

$|f_{G1}/f_{G23}|=0.29$ (8)

$f_{G1}/f_{U2}=0.16$ (9)

$f_{G1}/f_{Ua}=0.16$ (10)

$f_{G1}/f_{Ub}=0.26$ (11)

$r_{12}/d_{o12}=-0.90$ (12)

$f_{G1}/f_{L1}=0.63$ (13)

FIGS. 9A to 9D illustrate aberrations on the image plane of the microscope optical system 4 illustrated in FIG. 8. FIG. 9A illustrates a spherical aberration. FIG. 9B illustrates a sine condition violation amount. FIG. 9C illustrates astigmatism. FIG. 9D illustrates a comatic aberration. In these diagrams, "M" represents a meridional component, and "S" represents a sagittal component. As illustrated in FIGS. 9A to 9D, in the microscope optical system 4, aberrations are satisfactorily corrected, and a satisfactory imaging performance is achieved.

The microscope optical system above can also be referred to as a microscope observation optical system because the microscope optical system above is an optical system that is used principally for observation. An image sensor such as a CMOS or a CCD may be arranged in an image position in such a way that a sample can be observed on a monitor, or an eyepiece optical system may be arranged at a rear stage of the image position in such a way that visual observation can be performed.

What is claimed is:

1. A microscope optical system comprising in order from an object side:
    a first lens group having a positive refractive power;
    a second lens group; and
    a third lens group including a positive lens, wherein the first lens group includes:
        a first lens component that is arranged closest to an object, the first lens component including a first meniscus lens that has a meniscus shape with a concave surface facing the object side;
        a second lens component having a positive refractive power that has a meniscus lens shape with the concave surface facing the object side, the second lens component being arranged close to the first lens component on an image side of the first lens component; and
        a cemented lens including a positive lens and a negative lens that is made of a higher-dispersion material than a material of the positive lens,
    a height of an on-axis marginal ray becomes maximum in a lens component closest to an image in the first lens group,
    a spacing between the second lens group and the third lens group is a maximum lens spacing in an area on the object side of a positive lens arranged closest to the image from among the positive lens included in the third lens group, and
    when NA represents a numerical aperture of the microscope optical system, $\beta_{G3}$ represents a lateral magnification of the third lens group, $D_{G3i}$ represents a spacing between the third lens group and an image plane, and DG23 represents a spacing between the second lens group and the third lens group, the microscope optical system satisfies the following conditional expressions:

$0.25 < NA \leq 1.51$ (1);

$0.2 < \beta_{G3} < 3$ (2);

$0.1 < D_{G3i}/D_{G23} < 2.5$ (3).

2. The microscope optical system according to claim 1, wherein
    the third lens group includes a negative lens.

3. The microscope optical system according to claim 1, wherein
    when $h_{max}$ represents a maximum value of the height of the on-axis marginal ray, the microscope optical system satisfies the following conditional expression:

$0.2 \leq D_{G23}/h_{max} \leq 2$ (4).

4. The microscope optical system according to claim 2, wherein
    when $h_{max}$ represents a maximum value of the height of the on-axis marginal ray, the microscope optical system satisfies the following conditional expression:

$0.2 \leq D_{G23}/h_{max} \leq 2$ (4).

5. The microscope optical system according to claim 1, wherein
    when $\Phi_{G1i}$ represents an effective diameter of a lens surface closest to the image in the first lens group, and $\Phi_{G2i}$ represents an effective diameter of a lens surface closest to the image in the second lens group, the microscope optical system satisfies the following conditional expression:

$0.1 \leq \Phi_{G2i}/\Phi_{G1i} \leq 0.9$ (5).

6. The microscope optical system according to claim 2, wherein
    when $\Phi_{G1i}$ represents an effective diameter of a lens surface closest to the image in the first lens group, and $\Phi_{G2i}$ represents an effective diameter of a lens surface closest to the image in the second lens group, the microscope optical system satisfies the following conditional expression:

$0.1 \leq \Phi_{G2i}/\Phi_{G1i} \leq 0.9$ (5).

7. The microscope optical system according to claim 3, wherein
    when $\Phi_{G1i}$ represents an effective diameter of a lens surface closest to the image in the first lens group, and $\Phi_{G2i}$ represents an effective diameter of a lens surface closest to the image in the second lens group, the microscope optical system satisfies the following conditional expression:

$0.1 \leq \Phi_{G2i}/\Phi_{G1i} \leq 0.9$ (5).

8. The microscope optical system according to claim 4, wherein
    when $\Phi_{G1i}$ represents an effective diameter of a lens surface closest to the image in the first lens group, and $\Phi_{G2i}$ represents an effective diameter of a lens surface closest to the image in the second lens group, the microscope optical system satisfies the following conditional expression:

$0.1 \leq \Phi_{G2i}/\Phi_{G1i} \leq 0.9$ (5).

9. The microscope optical system according to claim 1, wherein
when $h_{2Gi}$ represents a height of the on-axis marginal ray on a lens surface closest to the image in the second lens group, the microscope optical system satisfies the following conditional expression:

$$0.1 \leq h_{2Gi}/h_{max} \leq 0.9 \quad (6).$$

10. The microscope optical system according to claim 1, wherein
when $h_{L11}$ represents a height of the on-axis marginal ray on a lens surface on the object side of the first meniscus lens, and $r_{11}$ represents a radius of curvature of the lens surface on the object side of the first meniscus lens, the microscope optical system satisfies the following conditional expression:

$$-0.95 \leq h_{L11}/r_{11} \leq -0.1 \quad (7).$$

11. The microscope optical system according to claim 1, wherein
when $f_{G1}$ represents a focal length of the first lens group, and $f_{G23}$ represents a synthetic focal length of an optical system that is configured of the second lens group and the third lens group, the microscope optical system satisfies the following conditional expression:

$$0 \leq f_{G1}/|f_{G23}| \leq 0.5 \quad (8).$$

12. The microscope optical system according to claim 1, wherein
when $f_{G1}$ represents a focal length of the first lens group, and $f_{U2}$ represents a focal length of the second lens component, the microscope optical system satisfies the following conditional expression:

$$0.05 \leq f_{G1}/f_{U2} \leq 0.6 \quad (9).$$

13. The microscope optical system according to claim 1, wherein
the second lens group includes two or more positive lens components, and
when $f_{G1}$ represents a focal length of the first lens group, and $f_{Ua}$ represents a focal length of a positive lens component closest to the object from among the two or more positive lens components included in the second lens group, the microscope optical system satisfies the following conditional expression:

$$0 \leq f_{G1}/f_{Ua} \leq 0.4 \quad (10).$$

14. The microscope optical system according to claim 13, wherein
when $f_{Ub}$ represents a focal length of a positive lens component second closest to the object from among the two or more positive lens components included in the second lens group, the microscope optical system satisfies the following conditional expression:

$$0 \leq f_{G1}/f_{Ub} \leq 0.4 \quad (11).$$

15. The microscope optical system according to claim 1, wherein
when $r_{12}$ represents a radius of curvature of a lens surface on the image side of the first meniscus lens, and $d_{o12}$ represents a length on an optical axis from an object plane to the lens surface on the image side of the first meniscus lens, the microscope optical system satisfies the following conditional expression:

$$-1.5 \leq r_{12}/d_{o12} \leq -0.75 \quad (12).$$

16. The microscope optical system according to claim 1, wherein
when $f_{G1}$ represents a focal length of the first lens group, and $f_{L1}$ represents a focal length of the first meniscus lens, the microscope optical system satisfies the following conditional expression:

$$-0.8 \leq f_{G1}/f_{L1} \leq 0.8 \quad (13).$$

17. The microscope optical system according to claim 3, wherein
when $h_{L11}$ represents a height of the on-axis marginal ray on a lens surface on the object side of the first meniscus lens, and $r_{11}$ represents a radius of curvature of the lens surface on the object side of the first meniscus lens, the microscope optical system satisfies the following conditional expression:

$$-0.95 \leq h_{L11}/r_{11} \leq -0.1 \quad (7).$$

18. The microscope optical system according to claim 5, wherein
when $h_{L11}$ represents a height of the on-axis marginal ray on a lens surface on the object side of the first meniscus lens, and $r_{11}$ represents a radius of curvature of the lens surface on the object side of the first meniscus lens, the microscope optical system satisfies the following conditional expression:

$$-0.95 \leq h_{L11}/r_{11} \leq -0.1 \quad (7).$$

19. The microscope optical system according to claim 3, wherein
when $f_{G1}$ represents a focal length of the first lens group, and $f_{G23}$ represents a synthetic focal length of an optical system that is configured of the second lens group and the third lens group, the microscope optical system satisfies the following conditional expression:

$$0 \leq f_{G1}/|f_{G23}| \leq 0.5 \quad (8).$$

20. The microscope optical system according to claim 5, wherein
when $f_{G1}$ represents a focal length of the first lens group, and $f_{G23}$ represents a synthetic focal length of an optical system that is configured of the second lens group and the third lens group, the microscope optical system satisfies the following conditional expression:

$$0 \leq f_{G1}/|f_{G23}| \leq 0.5 \quad (8).$$

* * * * *